US009025933B2

(12) United States Patent
Hattori et al.

(10) Patent No.: US 9,025,933 B2
(45) Date of Patent: May 5, 2015

(54) INFORMATION PROCESSING DEVICE, INFORMATION PROCESSING METHOD, PLAYBACK DEVICE, PLAYBACK METHOD, PROGRAM AND RECORDING MEDIUM

(75) Inventors: Shinobu Hattori, Tokyo (JP); Kuniaki Takahashi, Tokyo (JP); Don Eklund, Culver City, CA (US)

(73) Assignees: Sony Corporation, Tokyo (JP); Sony Pictures Entertainment, Culver City, CA (US)

( * ) Notice: Subject to any disclaimer, the term of this patent is extended or adjusted under 35 U.S.C. 154(b) by 462 days.

(21) Appl. No.: 12/821,829

(22) Filed: Jun. 23, 2010

(65) Prior Publication Data

US 2011/0200302 A1      Aug. 18, 2011

Related U.S. Application Data

(60) Provisional application No. 61/304,185, filed on Feb. 12, 2010.

(51) Int. Cl.
*H04N 9/82*      (2006.01)
*H04N 13/00*      (2006.01)
*H04N 21/488*      (2011.01)
(Continued)

(52) U.S. Cl.
CPC ........... *H04N 13/007* (2013.01); *H04N 13/004* (2013.01); *H04N 13/0048* (2013.01); *H04N 13/0059* (2013.01); *H04N 21/4325* (2013.01); *H04N 21/4884* (2013.01); *H04N 13/0055* (2013.01); *H04N 13/0066* (2013.01); *H04N 19/597* (2014.01)

(58) Field of Classification Search
CPC . H04N 5/76; H04N 13/0055; H04N 21/4884; H04N 9/8233; G11B 27/105; G11B 20/10527; G11B 2020/10611; G11B 2020/10537
USPC .......................... 386/239, 244, 245, 246, 248
See application file for complete search history.

(56) References Cited

U.S. PATENT DOCUMENTS

| 6,272,286 B1 | 8/2001 | Asada et al. |
| 6,532,041 B1 | 3/2003 | Monta et al. |
| 2004/0202454 A1* | 10/2004 | Kim et al. .................. 386/95 |

(Continued)

FOREIGN PATENT DOCUMENTS

| CN | 1152839 A | 6/1997 |
| CN | 1372763 A | 10/2002 |

(Continued)

OTHER PUBLICATIONS

U.S. Appl. No. 12/995,621, filed Dec. 1, 2010, Hattori.

(Continued)

*Primary Examiner* — Tat Chio
(74) *Attorney, Agent, or Firm* — Oblon, McClelland, Maier & Neustadt, L.L.P.

(57) ABSTRACT

An information processing device includes first encoding means for encoding an image by placing strip-shaped areas in the upper and lower sides, second encoding means for encoding data of first subtitles displayed in a third area formed by joining at least a part of one area of a first area and a second area together with the other area, first generating means for generating information referred to form the third area, and second generating means for generating the contents including the video stream, a stream of the first subtitles, and the control information.

14 Claims, 42 Drawing Sheets

(51) Int. Cl.
*H04N 21/432* (2011.01)
*H04N 19/597* (2014.01)

(56) References Cited

U.S. PATENT DOCUMENTS

| | | | |
|---|---|---|---|
| 2007/0248321 A1* | 10/2007 | Hamada et al. | 386/95 |
| 2009/0315979 A1 | 12/2009 | Jung et al. | |
| 2009/0324202 A1 | 12/2009 | Okubo et al. | |
| 2010/0021141 A1 | 1/2010 | Yamashita et al. | |
| 2011/0013888 A1* | 1/2011 | Sasaki et al. | 386/353 |
| 2011/0013890 A1* | 1/2011 | Sasaki et al. | 386/357 |

FOREIGN PATENT DOCUMENTS

| | | |
|---|---|---|
| EP | 0 766 463 B1 | 11/2003 |
| EP | 2 445 224 A1 | 4/2012 |
| JP | 03-201880 | 9/1991 |
| JP | 9-98389 A | 4/1997 |
| JP | 2004-274125 A | 9/2004 |
| JP | 2006-345217 | 12/2006 |
| JP | 2007-336376 A | 12/2007 |
| JP | 2009-147989 A | 7/2009 |
| JP | 2009-152882 A | 7/2009 |
| JP | 2009-159126 A | 7/2009 |
| WO | WO 2006/136989 A1 | 12/2006 |
| WO | WO 2009/157198 A1 | 12/2009 |
| WO | WO 2010/095074 A1 | 8/2010 |

OTHER PUBLICATIONS

International Search Report and Written Opinion issued Apr. 13, 2011 in Application No. PCT/US2011/024427.
U.S. Appl. No. 13/816,247, filed Feb. 11, 2013, Hattori, et al.
U.S. Appl. No. 13/818,506, filed Feb. 22, 2013, Hattori, et al.
U.S. Appl. No. 13/816,249, filed Feb. 11, 2013, Hattori.
U.S. Appl. No. 13/816,591, filed Feb. 12, 2013, Hattori, et al.
Office Action issued Nov. 15, 2012 in Japanese Application No. 2012-238436.
Office Action issued Nov. 15, 2012 in Japanese Application No. 2012-238437.
Office Action issued Nov. 15, 2012 in Japanese Application No. 2012-238438.
Office Action issued Nov. 20, 2012 in Japanese Application No. 2012-534450.
Office Action issued Aug. 28, 2012 in Japanese Patent Application No. 2012-534450.
Extended European Search Report issued on May 24, 2013, in European Patent Application No. 11742830.0.
Chinese Office Action issued Nov. 1, 2013, in China Patent Application No. 201180001678.6 (with English translation).
Japanese Office Action issued Sep. 11, 2014 in Patent Application No. 2013-054605 (without English Translation).
Office Action issued Jul. 11, 2014 in Chinese Patent Application No. 201180001678.6 (with English Translation).

* cited by examiner

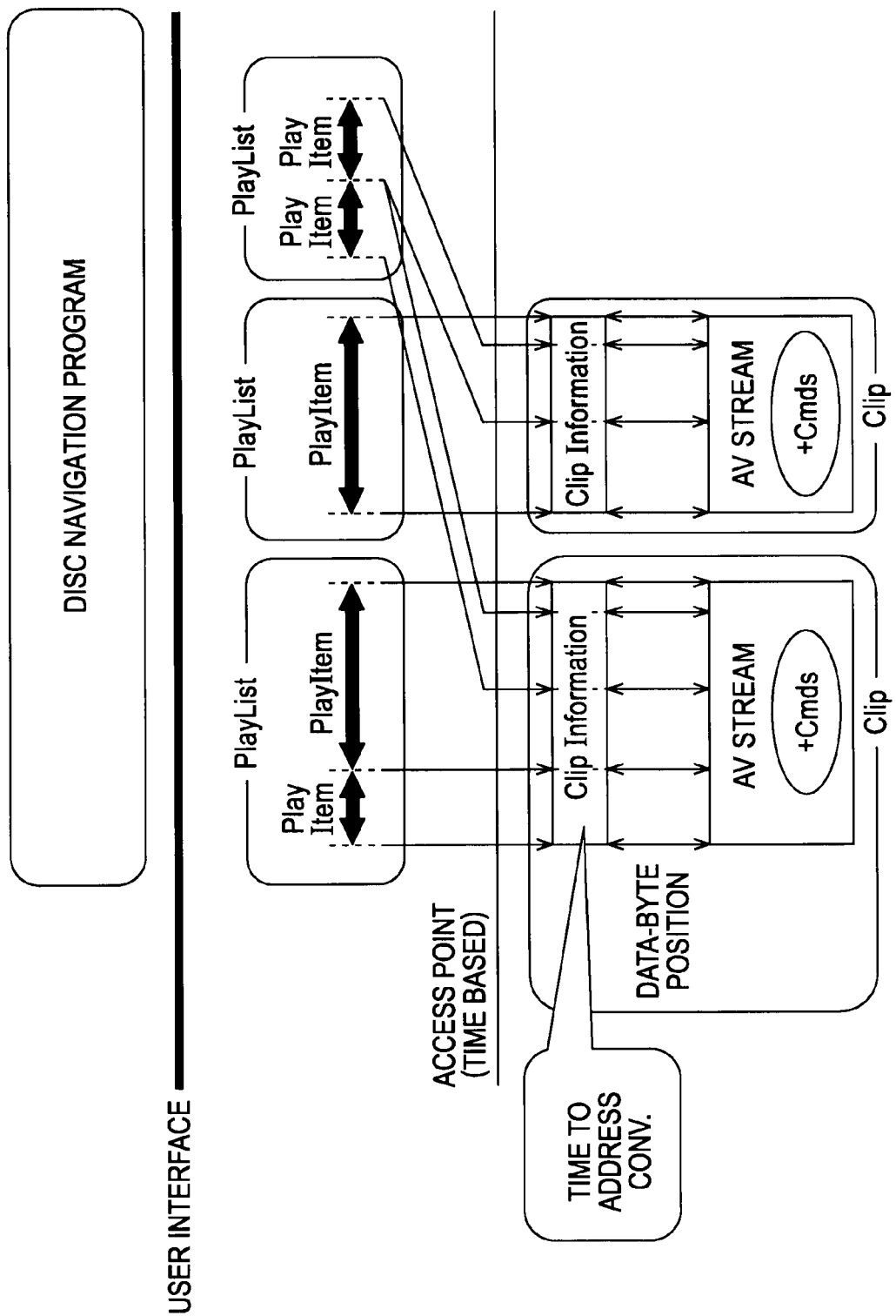

FIG. 12

| Syntax | No. of bits | Mnemonic |
|---|---|---|
| xxxxx.mpls { | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++) { | | |
|         padding_word | 16 | bslbf |
|     } | | |
|     PlayList() | | |
|     for(i=0; i<N2; i++) { | | |
|         padding_word | 16 | bslbf |
|     } | | |
|     PlayListMark() | | |
|     for(i=0; i<N3; i++) { | | |
|         padding_word | 16 | bslbf |
|     } | | |
|     ExtensionData() | | |
|     for(i=0; i<N4; i++) { | | |
|         padding_word | 16 | bslbf |
|     } | | |
| } | | |

FIG. 13

PlayList-Syntax

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|     PlayItem() | | |
|   } | | |
|   for (SubPath_id= 0; | | |
|     SubPath_id<number_of_SubPaths; | | |
|     SubPath_id++) { | | |
|     SubPath() | | |
|   } | | |
| } | | |

FIG. 14

SubPath-Syntax

| Syntax | No. of bits | Mnemonic |
|---|---|---|
| SubPath() { | | |
|   length | 32 | uimsbf |
|   reserved_for_future_use | 8 | bslbf |
|   SubPath_type | 8 | uimsbf |
|   reserved_for_future_use | 15 | uimsbf |
|   is_repeat_SubPath | 1 | bslbf |
|   reserved_for_future_use | 8 | bslbf |
|   number_of_SubPlayItems | 8 | uimsbf |
|   for (i=0;i< number_of_SubPlayItems;i++) { | | |
|     SubPlayItem(i) | | |
|   } | | |
| } | | |

FIG. 15

SubPlayItem(i)-Syntax

| Syntax | No. of bits | Mnemonic |
|---|---|---|
| SubPlayItem(i) { | | |
|     length | 16 | uimsbf |
|     Clip_Information_file_name[0]    //subclip_entry_id=0 | 8*5 | bslbf |
|     Clip_codec_identifier[0] | 8*4 | bslbf |
|     reserved_for_future_use | 31 | bslbf |
|     is_multi_Clip_entries | 1 | bslbf |
|     ref_to_STC_id[0] | 8 | uimsbf |
|     SubPlayItem_IN_time | 32 | uimsbf |
|     SubPlayItem_OUT_time | 32 | uimsbf |
|     sync_PlayItem_id | 16 | uimsbf |
|     sync_start_PTS_of_PlayItem | 32 | uimsbf |
|     if(is_multi_Clip_entries==1b) { | | |
|         reserved_for_future_use | 8 | bslbf |
|         num_of_Clip_entries | 8 | uimsbf |
|         for(subclip_entry_id=1;//Note:Entries after subclip_entry_id=0 | | |
|         subclip_entry_id<num_of_Clip_entries;subclip_entry_id ++) { | | |
|             Clip_Information_file_name[subclip_entry_id] | 8*5 | bslbf |
|             Clip_codec_identifier[subclip_entry_id] | 8*4 | bslbf |
|             ref_to_STC_id[subclip_entry_id] | 8 | uimsbf |
|             reserved_for_future_use | 8 | bslbf |
|         } | | |
|     } | | |
| } | | |

FIG. 16

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     }else{ | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 17

STN_table()

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0; <br>         video_stream_id < number_of_video_stream_entries; <br>         video_stream_id++) { | | |
|         stream_entry() | | |
|         stream_attribute() | | |
|     } | | |
|     for (audio_stream_id=0; <br>         audio_stream_id < number_of_audio_stream_entries; <br>         audio_stream_id++) { | | |
|         stream_entry() | | |
|         stream_attributes() | | |
|     } | | |
|     for (audio_stream_id2=0; <br>         audio_stream_id2 < number_of_audio_stream2_entries; <br>         audio_stream_id2++) { | | |
|         stream_entry() | | |
|         stream_attributes() | | |
|     } | | |
|     for (PG_textST_stream_id=0; <br>         PG_textST_stream_id < number_of_PG_textST_stream_entries; <br>         PG_textST_stream_id++) { | | |
|         stream_entry() | | |
|         stream_attribute() | | |
|     } | | |
|     for (IG_stream_id=0; <br>         IG_stream_id < number_of_IG_stream_entries; <br>         IG_stream_id++) { | | |
|         stream_entry() | | |
|         stream_attribute() | | |
|     } | | |
| } | | |

FIG. 18

| Syntax | No. of bits | Mnemonic |
|---|---|---|
| STN_table_SS() { | | |
| ---snip--- | | |
| for (PG_textST_stream_id=0;PG_textST_stream_id<number_of_ PG_textST_stream_entries;PG_textST_stream_id ++) { | | |
| reserved_for_future_use | 6 | bslbf |
| is_SS_PG | 1 | bslbf |
| is_AS_PG | 1 | bslbf |
| reserved_for_future_use | 8 | bslbf |
| PG_textST_offset_id_ref | 8 | uimsbf |
| ---snip--- | | |
| if(is_AS_PG==1b) { | | |
| stream_entry() | | |
| stream_attribute() | | |
| reserved_for_future_use | 4 | uimsbf |
| AS_PG_textST_offset_id_ref | 8 | uimsbf |
| } | | |
| ---snip--- | | |
| } | | |
| } | | |

FIG. 19

| Syntax | No. of bits | Mnemonic |
|---|---|---|
| active_video_window() { | | |
|    top_offset | 8 | uimsbf |
|    bottom_offset | 8 | uimsbf |
|    top_align_flag | 1 | uimsbf |
|    reserved_for_future_use | 7 | uimsbf |
|    align_offset | 8 | uimsbf |
|    fixed_subtitle_window_0 | 1 | uimsbf |
|    fixed_subtitle_window_1 | 1 | uimsbf |
|    reserved_for_future_use | 6 | uimsbf |
|    flipped_AS_PG_textST_offset_id_ref | 8 | uimsbf |
|    reserved_for_future_use | 16 | uimsbf |
| } | | |

FIG. 33
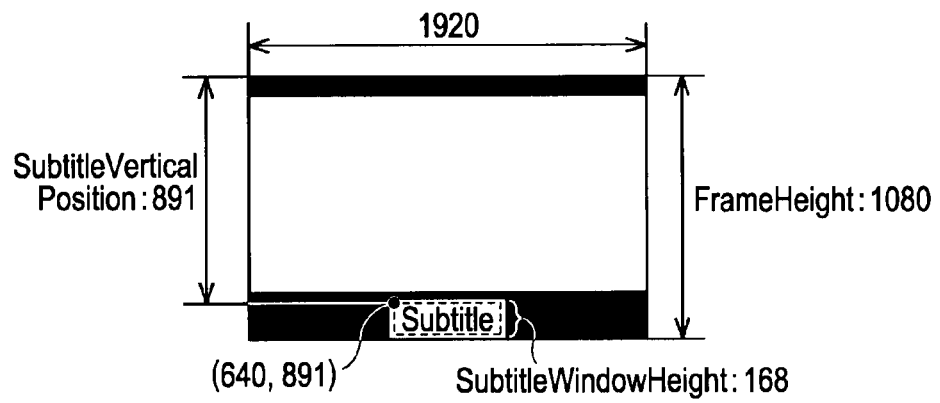
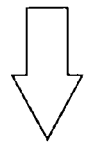
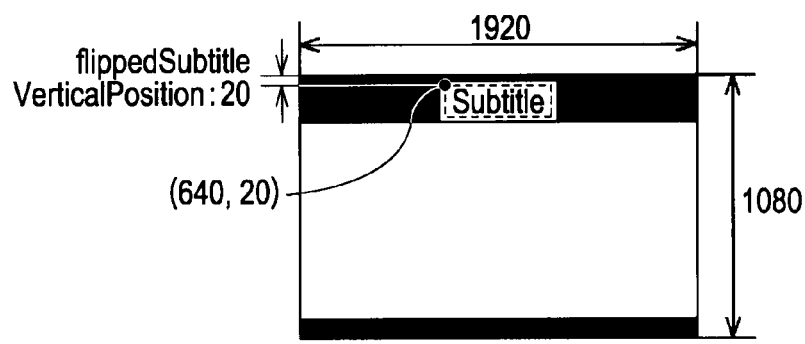

FIG. 34
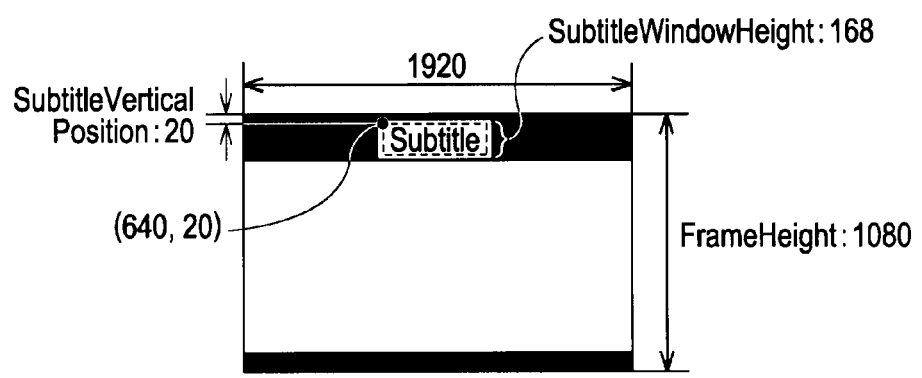
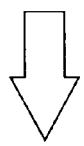
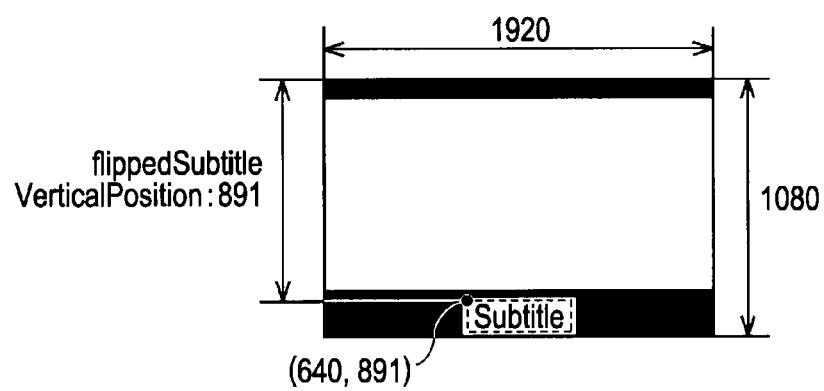

FIG. 37

| | | |
|---|---|---|
| STN_table_SS() | | |
| ---snip--- | | |
| for (PG_textST_stream_id=0;PG_textST_stream_id<number_of_ PG_textST_stream_entries; PG_textST_stream_id++) { | | |
| ---snip--- | | |
|     is_top_AS_PG_TextST | 1 | bslbf |
|     is_bottom_AS_PG_TextST | 1 | |
| ---snip--- | | |
|     if(is_top_AS_PG_TextST==1b) { | | |
|       stream_entry() | | |
|       stream_attribute() | | |
|       reserved_for_future_use | 8 | uimsbf |
|       AS_PG_textST_offset_id_ref | 8 | uimsbf |
|     } | | |
|     if(is_bottom_AS_PG_TextST==1b) { | | |
|       stream_entry() | | |
|       stream_attribute() | | |
|       reserved_for_future_use | 8 | uimsbf |
|       AS_PG_textST_offset_id_ref | 8 | uimsbf |
|     } | | |
| } | | |
| ---snip--- | | |
| } | | |

FIG. 38

| active_video_window() { | | |
|---|---|---|
| top_offset | 8 | uimsbf |
| bottom_offset | 8 | uimsbf |
| top_align_offset | 8 | uimsbf |
| bottom_align_offset | 8 | uimsbf |
| reserved_for_future_use | 32 | uimsbf |
| } | | |

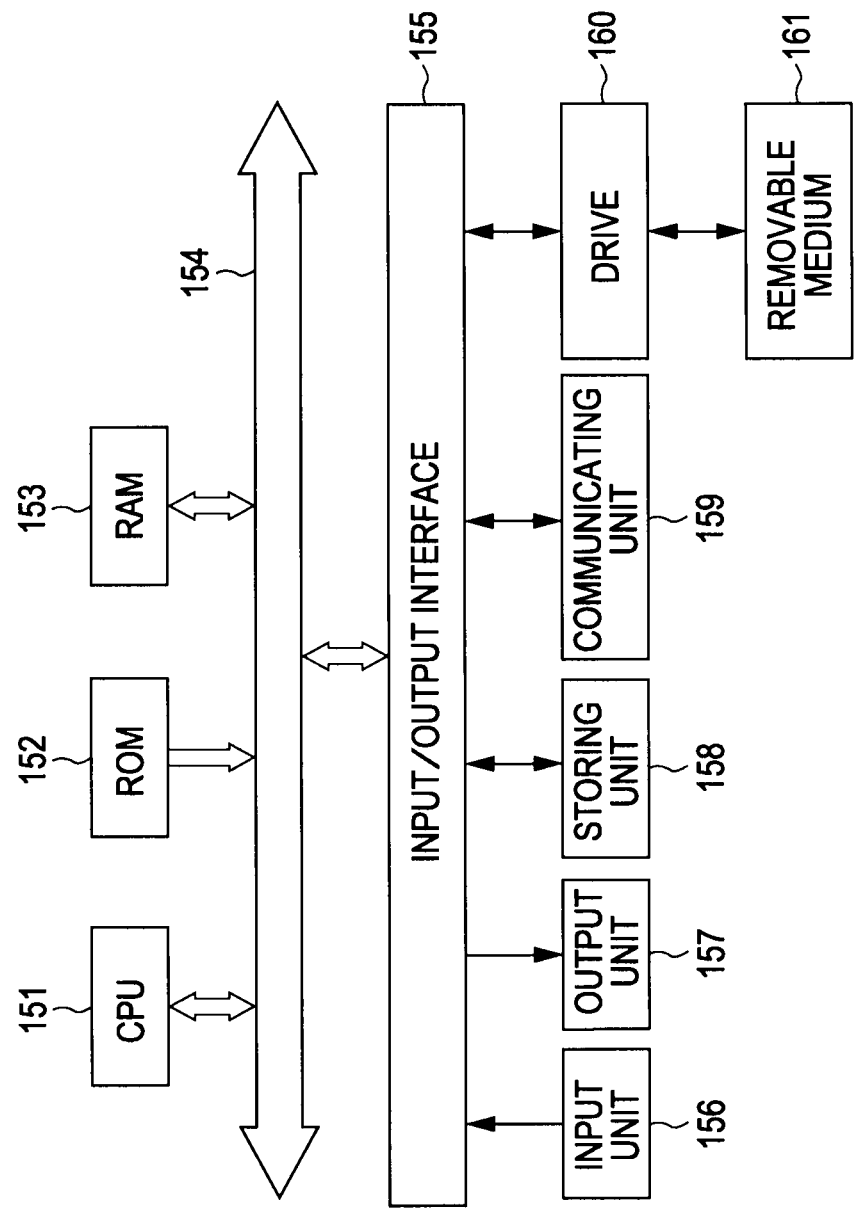

US 9,025,933 B2

INFORMATION PROCESSING DEVICE, INFORMATION PROCESSING METHOD, PLAYBACK DEVICE, PLAYBACK METHOD, PROGRAM AND RECORDING MEDIUM

BACKGROUND OF THE INVENTION

1. Field of the Invention

The present invention relates to an information processing device, an information processing method, a playback device, a playback method, a program, and a recording medium, and particularly, to an information processing device, an information processing method, a playback device, a playback method, a program, and a recording medium which can ensure a sufficient area as a display area for subtitles.

2. Description of the Related Art

In recent years, there is a 3-dimensional (3D) display mode as a mode for displaying an image, which is realized accompanied by an increase in the number of pixels and frame rate on a display such as a liquid crystal display (LCD) or the like. According to the 3D display mode, viewers can 3-dimensionally perceive objects.

In the future, it is conceived that a Blu-Ray (trademark) Disc (BD), such as BD-ROM, on which 3D content such as movies including video data 3-dimensionally perceivable as above is recorded is to be distributed.

SUMMARY OF THE INVENTION

When a 3D image is displayed by playing back 3D content recorded on BD or the like, there is a problem of where and how subtitles are to be displayed.

FIG. 1 is a diagram illustrating the composition of a screen when an image with an aspect ratio which has a longer length in the horizontal direction than in the vertical direction, which is greater than 16:9, such as a size of a CinemaScope, is displayed on a display device with an aspect ratio of 16:9.

As shown in FIG. 1, images in content such as a movie are displayed in the form of a so-called letter box, and black frame areas are formed at the upper and lower sides of the screen. Subtitles in 2D are generally displayed in a subtitle area formed at the center lower side of the video display area, as shown by the broken line.

When images included in 3D contents are encoded with an aspect ratio which has a longer length in the horizontal direction than in the vertical direction, which is greater than 16:9, the images in the 3D content played back with a BD player or the like are displayed on the screen of a television set with an aspect ratio of 16:9 as shown in FIG. 1.

In that case, for example, when 2-dimensional subtitles are displayed in the video display area with displayed 3D content, as the 2D content are generally is, the subtitles overlap objects that are displayed 3-dimensionally, and the subtitles may be difficult to be read. In addition, when the subtitles are also 3-dimensionally displayed, viewers may feel tired while watching the images due to parallax.

Furthermore, when subtitles are displayed in the black frame area, there is a possibility that the display area may be insufficient if the subtitles are to be shown in several rows at a time and, at the same time, the characters of the subtitles are to be displayed in readable sizes.

The present invention took into consideration such problems and it is desirable to secure sufficient area as a display area for the subtitles.

According to a first embodiment of the present invention, an information processing device includes a first encoding unit that encodes an image by placing strip-shaped areas in the upper and lower sides over the entire horizontal direction for each frame, a second encoding unit that encodes data of first subtitles displayed in a third area formed by joining at least a part of one area of a first area, which is the strip-shaped area in the upper side, and a second area, which is the strip-shaped area in the lower side, together with the other area, a first generating unit that generates information including information which is referred to in order to form the third area by moving the position of an effective image frame of the image included in a frame obtained by decoding a video stream, which is encoded data of the image, and indicates an arrangement position of the effective image frame, as control information to control the playback of content, and a second generating unit that generates the contents including the video stream, a stream of the first subtitles, which is encoded data of the first subtitles, and the control information.

According to the above embodiment of the present invention, there is provided the information processing device in which the first generating unit generates the control information which further includes flag information indicating whether the stream of the first subtitles is included in the content, and causes the control information to include information indicating an arrangement position of the effective image frame when the flag information indicates that the stream of the first subtitles is included in the content.

According to the above embodiment of the present invention, there is provided the information processing device in which the first generating unit generates a first offset value used in acquiring a position in the upper end of the effective image frame, a second offset value used in acquiring a position in the lower end of the effective image frame, information indicating whether the effective image frame is to be moved in the upper direction or lower direction based on a position during encoding, and a third offset value used in acquiring the amount of movement of the effective image frame, as information indicating the arrangement position of the effective image frame.

According to the above embodiment of the present invention, there is provided the information processing device in which the second encoding unit encodes data of second subtitles to be displayed within the effective image frame, and the second generating unit generates the content which further includes a stream of the second subtitles, which is encoded data of the second subtitles.

According to the above embodiment of the present invention, there is provided the information processing device in which the first generating unit generates information indicating fixing of a relationship between a position of a display area of the second subtitles and a position of the effective image frame, as the information indicating the arrangement position of the effective image frame.

According to a second embodiment of the present invention, an information processing method includes the steps of encoding an image by placing strip-shaped areas in the upper and lower sides over the entire horizontal direction for each frame, encoding subtitle data to be displayed in a third area formed by joining at least a part of one area of a first area, which is the strip-shaped area in the upper side, and a second area, which is the strip-shaped area in the lower side, together with the other area, generating information including information which is referred to in order to form the third area by moving a position of an effective image frame of the image included in a frame obtained by decoding a video stream, which is encoded data of the image, and indicates an arrangement position of the effective image frame, as control information to control the playback of content, and generating the contents including the video stream, a stream of the subtitles, which is encoded data of the subtitles, and the control information.

According to a third embodiment of the present invention, a program causes a computer to execute a process including the steps of encoding an image by placing strip-shaped areas in the upper and lower sides over the entire horizontal direction for each frame, encoding subtitle data to be displayed in a third area formed by joining at least a part of one area of a first area, which is the strip-shaped area in the upper side, and a second area, which is the strip-shaped area in the lower side, together with the other area, generating information including information which is referred to in order to form the third area by moving a position of an effective image frame of the image included in a frame obtained by decoding a video stream, which is encoded data of the image, and indicates an arrangement position of the effective image frame, as control information to control the playback of content, and generating the contents including the video stream, a stream of the subtitles, which is encoded data of the subtitles, and the control information.

According to a fourth embodiment of the present invention, a playback device includes a first decoding unit that decodes a video stream obtained by encoding an image by placing strip-shaped areas in the upper and lower sides over the entire horizontal direction for each frame, a second decoding unit that decodes a stream of the first subtitles obtained by encoding data of the first subtitles to be displayed in a third area formed by joining at least a part of one area of a first area, which is the strip-shaped area in the upper side, and a second area, which is the strip-shaped area in the lower side, together with the other area, an image processing unit that displays the image within an effective image frame by moving a position of the effective image frame by referring to information indicating an arrangement position of the effective image frame, which is included in control information controlling the playback of content, and is referred to in order to form the third area by moving the position of the effective image frame of the image included in a frame obtained by decoding the video stream, and a subtitle data processing unit that displays the first subtitles in the third area formed by moving the position of the effective image frame.

According to the above embodiment of the present invention, there is provided the playback device in which, based on a first offset value used in acquiring a position in the upper end of the effective image frame, a second offset value used in acquiring a position in the lower end of the effective image frame, moving direction information indicating whether the effective image frame is to be moved in the upper direction or lower direction based on a position during encoding, and a third offset value used in acquiring the amount of movement of the effective image frame, which are information indicating the arrangement position of the effective image frame, the image processing unit acquires the position of the effective image frame in the upper end by using the first offset value and the position of the effective image frame in the lower end by using the second offset value and moves a position of the effective image frame having the positions in the upper end and the lower end in a direction expressed by the moving direction information by an amount acquired by using the third offset value.

According to the above embodiment of the present invention, there is provided the playback device in which, when the stream of first subtitles is a stream for displaying subtitles in the third area formed in the upper side of the effective image frame, based on a first offset value used in acquiring a position in the upper end of the effective image frame, a second offset value used in acquiring a position in the lower end of the effective image frame, and a third offset value used in acquiring a position in the upper end of the effective image frame after movement of the position based on the upper end of the frame, which are information indicating the arrangement position of the effective image frame, the image processing unit acquires the position in the upper end of the effective image frame by using the first offset value and the position in the lower end of the effective image frame by using the second offset value, and moves a position in the upper end of the effective image frame having the positions in the upper end and lower end so as to be in the position after the movement of the position acquired by using the third offset value.

According to the above embodiment of the present invention, there is provided the playback device in which, when the stream of first subtitles is a stream for displaying subtitles in the third area formed in the lower side of the effective image frame, based on a first offset value used in acquiring a position in the upper end of the effective image frame, a second offset value used in acquiring a position in the lower end of the effective image frame, and a third offset value used in acquiring a position in the upper end of the effective image frame after movement of the position based on the upper end of the frame, which are information indicating the arrangement position of the effective image frame, the image processing unit acquires the position in the upper end of the effective image frame by using the first offset value and the position in the lower end of the effective image frame by using the second offset value, and moves a position in the upper end of the effective image frame having the positions in the upper end and lower end so as to be in the position after the movement of the position acquired by using the third offset value.

According to the above embodiment of the present invention, there is provided the playback device in which the second decoding unit decodes a stream of second subtitles obtained by encoding data of the second subtitles to be displayed within the effective image frame, and the subtitle data processing unit sets a position indicated by position information in which a display area of the second subtitles is included in the stream of the second subtitles and displays the second subtitles.

According to the above embodiment of the present invention, there is provided the playback device in which the image processing unit moves a position of the third area when it is instructed that the third area, which is formed by moving the position of the effective image frame, is moved to another position, and the subtitle data processing unit sets the display area of the second subtitles on a position where a relationship between the display area of the second subtitles and the position of the effective image frame does not change, based on information indicating fixing of the relationship with respect to the position of the effective image frame, which is included in information indicating the arrangement position of the effective image frame, and displays the second subtitles.

According to the above embodiment of the present invention, there is provided the playback device further including a storing unit that stores a value which indicates whether a mode in which the first subtitles are displayed in the third area is set or not, and in which, in a case where a value that indicates the mode is set is set in the storing unit, and when a value that indicates the stream of the first subtitles exists is included in playback control information for controlling the video stream and the stream of the first subtitles, the second decoding unit performs decoding of the stream of the first subtitles, and the image processing unit moves the position of the effective image frame to display the image in the effective image frame of which the position is moved.

According to a fifth embodiment of the present invention, a playback method includes the steps of decoding a video stream obtained by encoding an image by placing strip-shaped areas in the upper and lower sides over the entire horizontal direction for each frame, decoding a stream of subtitles obtained by encoding subtitle data to be displayed in a third area formed by joining at least a part of one area of a first area, which is the strip-shaped area in the upper side, and a second area, which is the strip-shaped area in the lower side, together with the other area, displaying the image within an effective image frame by moving a position of the effective image frame by referring to information indicating an arrangement position of the effective image frame, which is included in control information controlling the playback of content, and is referred to in order to form the third area by moving the position of the effective image frame of the image included in a frame obtained by decoding the video stream, and displaying the subtitles in the third area formed by moving the position of the effective image frame.

According to a sixth embodiment of the present invention, a program causes a computer to execute a process including the steps of decoding a video stream obtained by encoding an image by placing strip-shaped areas in the upper and lower sides over the entire horizontal direction for each frame, decoding a stream of subtitles obtained by encoding subtitle data to be displayed in a third area formed by joining at least a part of one area of a first area, which is the strip-shaped area in the upper side, and a second area, which is the strip-shaped area in the lower side, together with the other area, displaying the image within an effective image frame by moving a position of the effective image frame by referring to information indicating an arrangement position of the effective image frame, which is included in control information controlling the playback of content, and is referred to in order to form the third area by moving the position of the effective image frame of the image included in a frame obtained by decoding the video stream, and displaying the subtitles in the third area formed by moving the position of the effective image frame.

According to a seventh embodiment of the present invention, there is provided a recording medium having information recorded thereon, and the information includes a video stream obtained by encoding an image by placing strip-shaped areas in the upper and lower sides over the entire horizontal direction for each frame, a stream of subtitles obtained by encoding subtitle data to be displayed in a third area formed by joining at least a part of one area of a first area, which is the strip-shaped area in the upper side, and a second area, which is the strip-shaped area in the lower side, together with the other area, and control information including information indicating an arrangement position of an effective image frame, which is information controlling the playback of content and is referred to in order to form the third area by moving a position of the effective image frame of the image included in a frame obtained by decoding the video stream.

According to an embodiment of the present invention, an image is encoded by placing strip-shaped areas in the upper and lower sides over the entire horizontal direction for each frame, and the subtitle data are encoded, which are displayed in the third area formed by joining at least a part of one area of the first area, which is the strip-shaped area in the upper side, and the second area, which is the strip-shaped area in the lower side, together with the other area. In addition, as control information controlling the playback of content, information is generated which is referred to in order to form the third area by moving the position of the effective image frame of the image included in a frame obtained by decoding a video stream, which is encoded data of the image and which includes information indicating an arrangement position of the effective image frame, and the content is generated which includes the video stream, a subtitle stream, which is encoded data of the subtitle data and the control information.

According to another embodiment of the present invention, a video stream is decoded which is obtained by encoding an image by placing strip-shaped areas in the upper and the lower sides over the entire horizontal direction for each frame, and a stream of subtitles are decoded which is obtained by encoding the subtitle data displayed in a third area formed by joining at least a part of one area of a first area, which is the strip-shaped area in the upper side, and a second area, which is the strip-shaped area in the lower side, together with the other area. In addition, information is referred to which is included in control information controlling the playback of content, is referred to in order to form the third area by moving the position of an effective image frame of the image included in a frame obtained by decoding the video stream, and indicates the arrangement position of the effective image frame, then the position of the effective image frame is moved, the image is displayed within the effective image frame, and the subtitles are displayed in the third area formed by moving the position of the effective image frame.

According to the present invention, it is possible to secure sufficient area as a display area for subtitles.

BRIEF DESCRIPTION OF THE DRAWINGS

FIG. 4 is a diagram illustrating an example when an image is referred to;

FIG. 9 is a diagram illustrating an example of a management structure of an AV stream;

FIG. 12 is a diagram illustrating the syntax of a PlayList file;

FIG. 13 is a diagram illustrating the syntax of PlayList( );

FIG. 14 is a diagram illustrating the syntax of SubPath( );

FIG. 15 is a diagram illustrating the syntax of SubPlayItem( );

FIG. 16 is a diagram illustrating the syntax of PlayItem( );

FIG. 17 is a diagram illustrating the syntax of STN_table( );

FIG. 18 is a diagram illustrating an example of the syntax of STN_table_SS( );

FIG. 19 is a diagram illustrating an example of the syntax of active_video_window( );

FIG. 33 is a diagram illustrating an example of modification in a composition of a frame realized by a flip function;

FIG. 34 is a diagram illustrating an example of another modification in a composition of a frame;

FIG. 37 is a diagram illustrating another example of the syntax of STN_table_SS( );

FIG. 38 is a diagram illustrating another example of the syntax of active_video_window( );

FIG. 46 is a block diagram illustrating an example of a composition of hardware of a computer.

DESCRIPTION OF THE PREFERRED EMBODIMENTS

Example of Composition of Playback System

Figure 2:
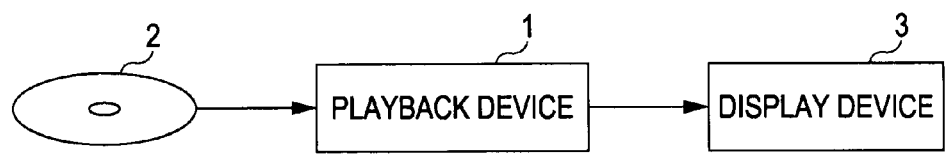
FIG. 2 is a diagram illustrating an example of a composition of a playback system including a playback device according to an embodiment of the present invention.

FIG. 2 is a diagram illustrating an example of a composition of a playback system including a playback device 1 according to an embodiment of the present invention.

The playback system of FIG. 2 is composed such that the playback device 1 and a display device 3 are connected to each other with a High Definition Multimedia Interface (HDMI) cable or the like. The playback device 1 is mounted with an optical disc 2 such as a BD-ROM or the like, which is an optical disc with the BD standard.

The optical disc 2 is recorded with a stream necessary for displaying 3D images having 2 viewpoints thereon. As a mode of encoding for recording such as stream on the optical disc 2, for example, H.264 Advanced Video Coding (AVC)/Multi-view Video Coding (MVC) is employed.

The playback device 1 is a player for 3D playback of the stream recorded on the optical disc 2. The playback device 1 plays back the stream recorded on the optical disc 2 and displays 3D images obtained by the playback on a display device 3 including a television set or the like. Sound also is played back by the playback device 1 in the same way, and output from a speaker provided in the display device 3.

H.264 AVC/MVC Profile

In the H.264 AVC/MVC, a video stream called a Base view video stream and a video stream called a Dependent view video stream are defined. Hereinafter, appropriately, the H.264 AVC/MVC is simply referred to as an MVC.

Figure 3:
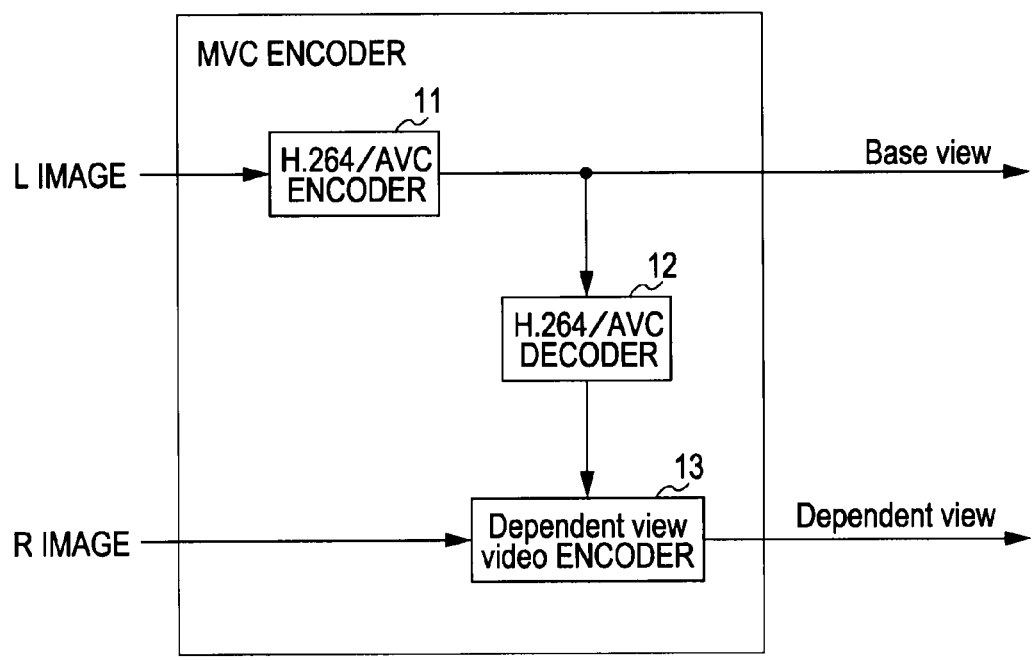
FIG. 3 is a block diagram illustrating an example of a composition of an MVC encoder.

FIG. 3 is a block diagram illustrating an example of a composition of an MVC encoder.

As shown in FIG. 3, the MVC encoder is constituted with an H.264/AVC encoder 11, an H.264/AVC decoder 12, and a Dependent view video encoder 13. For a same object, a camera for an L image (left viewpoint) and a camera for an R image (right viewpoint) capture images.

The stream of the L image captured by the camera for the L image is input to the H.264/AVC encoder 11. In addition, the stream of the R image captured by the camera for the R image is input to the Dependent view video encoder 13.

The H.264/AVC encoder 11 encodes the stream of the L image as an H.264/High Profile video stream. The H.264/AVC encoder 11 outputs the AVC video stream obtained by the encoding as a Base view video stream. The Base view video stream output from the H.264/AVC encoder 11 is output outside while also being supplied to the H.264/AVC decoder 12.

The H.264/AVC decoder 12 decodes the AVC video stream supplied from the H.264/AVC encoder 11, and outputs the stream of the L image obtained by the decoding to the Dependent view video encoder 13.

The Dependent view video encoder 13 performs encoding based on the stream of the L image supplied from the H.264/AVC decoder 12 and the stream of the R image input from outside. The Dependent view video encoder 13 outputs the stream obtained by the encoding as a Dependent view video stream.

Figure 4:
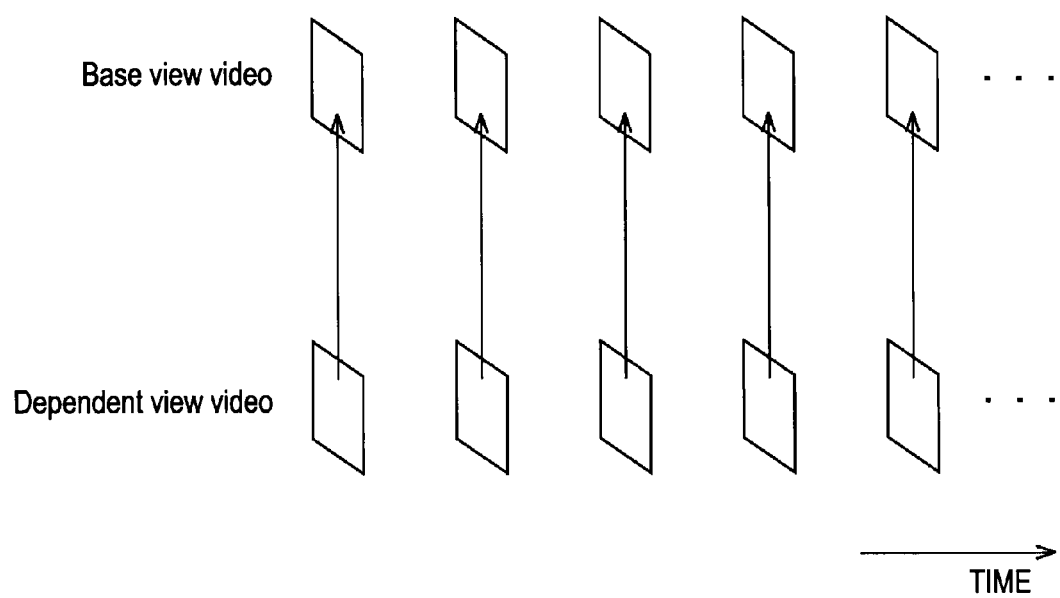

A Base view video is not allowed for a predictive coding that has another stream as a reference image, but as shown in FIG. 4, the Dependent view video is allowed for the predictive coding that has a Base view video as a reference image. For example, when encoding is performed by having an L image as the Base view video and an R image as the Dependent view video, the data amount of the Dependent view video stream obtained as the result is smaller than the data amount of the Base view video stream.

Furthermore, prediction of the Base view video in the time direction is performed because of encoding with H.264/AVC. In addition, for the Dependent view video, prediction in the time direction is carried out together with prediction between views. When the Dependent view video is decoded, it is necessary to finish the decoding of the corresponding Base view video first, which is a target for reference during encoding.

The Base view video stream output from the H.264/AVC encoder 11 and the Dependent view video stream output from the Dependent view video encoder 13 are multiplexed as an MPEG2 TS together with, for example, the data of audio or subtitles. The TS (MPEG2 TS) obtained by the multiplex is recorded on the optical disc 2 in a recording unit provided in the rear part of the MVC encoder and provided to the playback device 1.

In this example, the L image is encoded as the Base view video and the R image is encoded as the Dependent view video, but on the contrary, the R image may be encoded as the Base view video and the L image may be encoded as the Dependent view video. Hereinafter, the case where the L image is encoded as the Base view video and the R image is encoded as the Dependent view video will be described.

Figure 5:
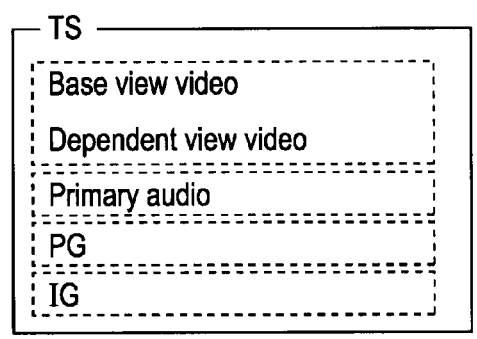
FIG. 5 is a diagram illustrating an example of a composition of a TS.

FIG. 5 is a diagram illustrating an example of a composition of the TS recorded on the optical disc 2.

In the TS of FIG. 5, streams of the Base view video, the Dependent view video, Primary audio, Presentation Graphics (PG), and Interactive Graphics (IG) are multiplexed. It may be possible to multiplex the Base view video and the Dependent view video in different TS. The PG stream is the stream of subtitles and the stream of IG is the stream of graphics such as a menu screen.

In display modes of subtitles by the playback device 1, there are a mode of displaying subtitles by overlapping with video (Base view video, and Dependent view video), and a mode of displaying subtitles not overlapping with video in an area secured for the subtitles. A user can 3-dimensionally see not only subtitles but also video in a manner that subtitles for the left eye and subtitles for the right eye are generated based on the subtitle data included in the PG stream and each of them is displayed with the Base view video and the Dependent view video.

Subtitles can be 3-dimensionally displayed not only in the former mode of displaying the subtitles by overlapping with video but also in the mode of displaying subtitles in an area secured for the subtitles, but hereinafter the former mode of subtitle display is referred to as 3D subtitle mode, and the latter mode of subtitle display is referred to as an aligned subtitle mode. In the aligned subtitle mode, at least a part of one area of two black areas formed of the upper and lower sides in a frame approaches the other area and the subtitles are 2-dimensionally or 3-dimensionally displayed there.

On the optical disc 2, the PG stream for the 3D subtitle mode and the PG stream for the aligned subtitle mode are appropriately recorded.

Regarding Aligned Subtitle Mode

Figure 6:
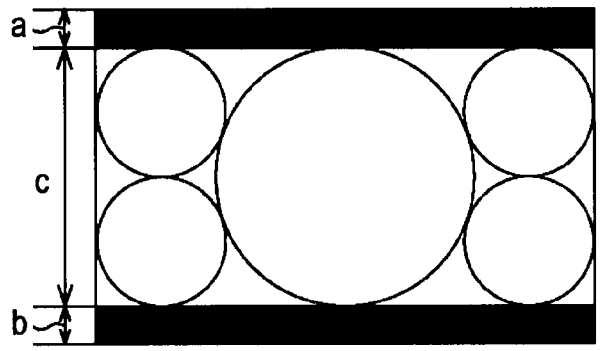
FIG. 6 is a diagram illustrating a composition of a frame obtained by decoding a video stream.

FIG. 6 is a diagram illustrating a composition of a frame obtained by decoding a video stream recorded on the optical disc 2.

The size of the frame shown in FIG. 6 is 1920×1080 pixels. The image frame of video has an aspect ratio that the horizontal direction is longer than the vertical direction, which is greater than the ratio of 16:9, and in the upper and lower sides of the frame, strip-shaped black areas having a predetermined width in the vertical direction are formed over the entire horizontal direction.

The number of pixels of the vertical direction in the upper black area is a, and the number of pixels of the vertical direction in the lower black area is b. An area having the number of pixels in the vertical direction of c, which is interposed between the upper and the lower black areas, is an effective image frame of video, and video of the Base view and Dependent view is displayed there.

The Base view video and the Dependent view video recorded on the optical disc 2 are encoded in the form that the upper and lower black areas are added thereto for each frame, as shown in FIG. 6. When the streams of the Base view video and the Dependent view video are decoded, the data of a frame having the composition in FIG. 6 can be obtained.

Figure 7A:
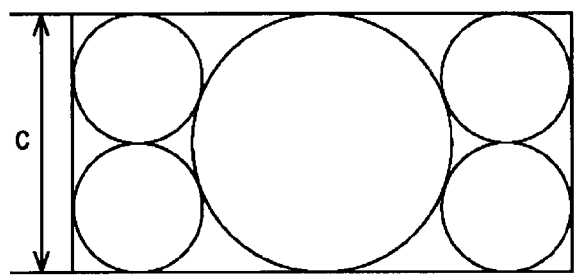
FIGS. 7A and 7B are diagrams illustrating examples of the clipping of an area.

When subtitles are displayed in the aligned subtitle mode, only the effective image frame of video as shown in FIG. 7A is clipped from the frame obtained by decoding the streams of Base view video and the Dependent view video in the playback device 1. The clipped range is designated according to the information included in the control information recorded on the optical disc 2.

Figure 7B:
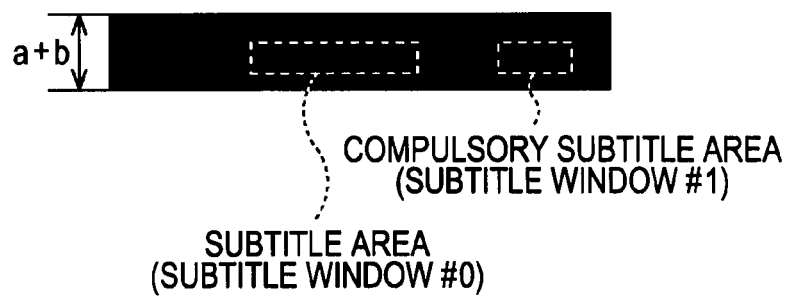

Furthermore, the black areas in the upper and lower sides remaining when the effective image frame of the video is clipped join together, and an area where the number of pixels in the vertical direction is a+b as shown in FIG. 7B is secured as a display area for subtitles in the aligned subtitle mode.

Hereinafter, the display area for subtitles formed by joining at least a part of one area of the black areas in the upper and lower side is appropriately referred to as an aligned subtitle area.

Figure 8A:
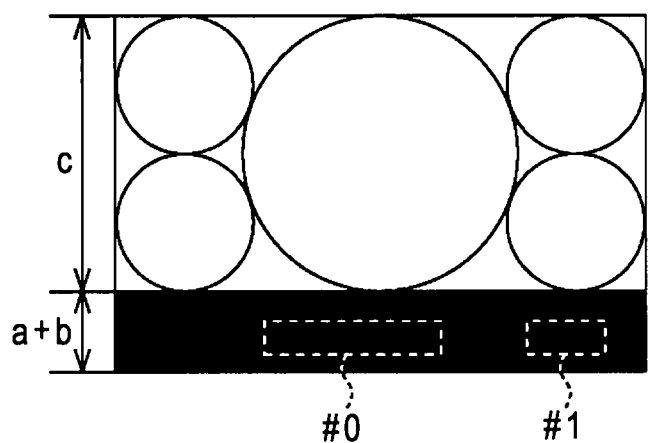
FIGS. 8A and 8B are diagrams illustrating compositions of frames when subtitles are displayed in an aligned subtitle mode.
Figure 8B:
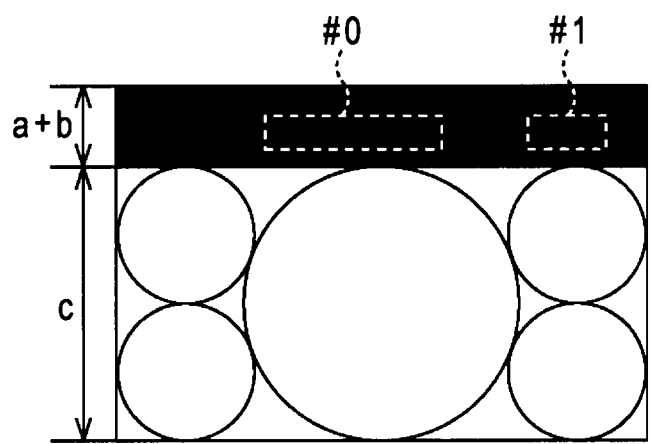

FIGS. 8A and 8B are diagrams illustrating examples of compositions of frames when subtitles are displayed in the aligned subtitle mode.

FIG. 8A is a diagram illustrating an example where the effective image frame of the video is arranged in the upper side, and the aligned subtitle area having the number of pixels in the vertical direction of a+b is arranged in the lower side. FIG. 8B is a diagram illustrating an example where the effective image frame of the video is arranged in the lower side, and the aligned subtitle area having the number of pixels in the vertical direction of a+b is arranged in the upper side. In these examples, the aligned subtitle area is formed by joining one entire area of the black areas in the upper and lower side together with the other area.

As shown by the dotted lines in FIGS. 8A and 8B, a subtitle window is arranged in the aligned subtitle area. The subtitle window #0 is, for example, an area for displaying subtitles indicating the content of conversations between characters, and the subtitle window #1 is an area for so-called compulsory subtitles indicating the contents of sign boards or the like when they appear in the effective image frame in a video. In addition, the subtitle window #1 for displaying the compulsory subtitles can be located within the effective image frame of the video. The subtitle window #0 also can be located within the effective image frame of the video.

As such, in the playback device 1, subtitles are displayed in the area formed by joining at least a part of one area of the black areas in the upper and lower sides included in a frame obtained when a video stream is decoded together with the other area.

Accordingly, when subtitles are displayed within the effective image frame of a video together with 3D images, it may be difficult to read the subtitles because the subtitles become by the shadow of an object (located in the inside deeper the object), but such a case can be prevented.

Furthermore, when the subtitles are displayed within the effective image frame of the video together with 3D images, it is necessary for the producer (author) of the contents to set the display area of the subtitles so as not to become the shadow of the object, but increase in such burden can be prevented.

Furthermore, in comparison to the case where subtitles are displayed in a black area in the upper or the lower side without joining in one side, it is possible to secure a spacious area as the display area for the subtitles. For example, when subtitles in the Japanese language are displayed, a more spacious area in the vertical direction is necessary for attaching Kana letters to the Chinese characters in the subtitles, and it is possible to respond to such a necessity.

Management Structure of AV Stream

FIG. 9 is a diagram illustrating an example of a management structure of an AV stream by the playback device 1.

The management of the AV stream is performed by using 2 layers of PlayList and Clip as shown in FIG. 9. The Clip is constituted with the AV stream which is TS obtained by multiplexing video data and audio data and the corresponding Clip Information (Clip Information including attribute information relating to the AV stream).

The AV stream is developed on a time axis and each access point is designated in the PlayList mainly by a time stamp. The Clip Information is used for locating the address where decoding in the AV stream is supposed to be started.

The PlayList is a gathering of playback zones of the AV stream. One playback zone in the AV stream is called a PlayItem. The PlayItem is expressed by an IN point and an OUT point of the playback zone on the time axis. The PlayList includes one or plural PlayItems.

The first PlayList from the left of FIG. 9 includes two PlayItems, and the first half and the latter half of the AV stream included in the Clip in the left side are each referred to by the two PlayItems.

The second PlayList from the left includes one PlayItem, and the entire AV stream included in the Clip in the right side is referred to by the PlayItem.

The third PlayList from the left includes two PlayItems, and a part of the AV stream included in the Clip in the left side and a part of the AV stream included in the Clip in the right side are each referred to by the two PlayItems.

For example, when the PlayItem in the left side included in the first PlayList from the left is designated as a playback target by a disc navigation program, the first half of the AV stream included in the Clip in the left side and referred to by the PlayItem is played back. As such, the PlayList is used as playback control information for controlling the playback of the AV stream.

In the PlayList, a playback path made by the arrangement of one or more PlayItems is called a main path.

Furthermore, in the PlayList, a playback path constituted by the arrangement of one or more SubPlayItems in parallel with the main path is called a sub path.

Figure 10:
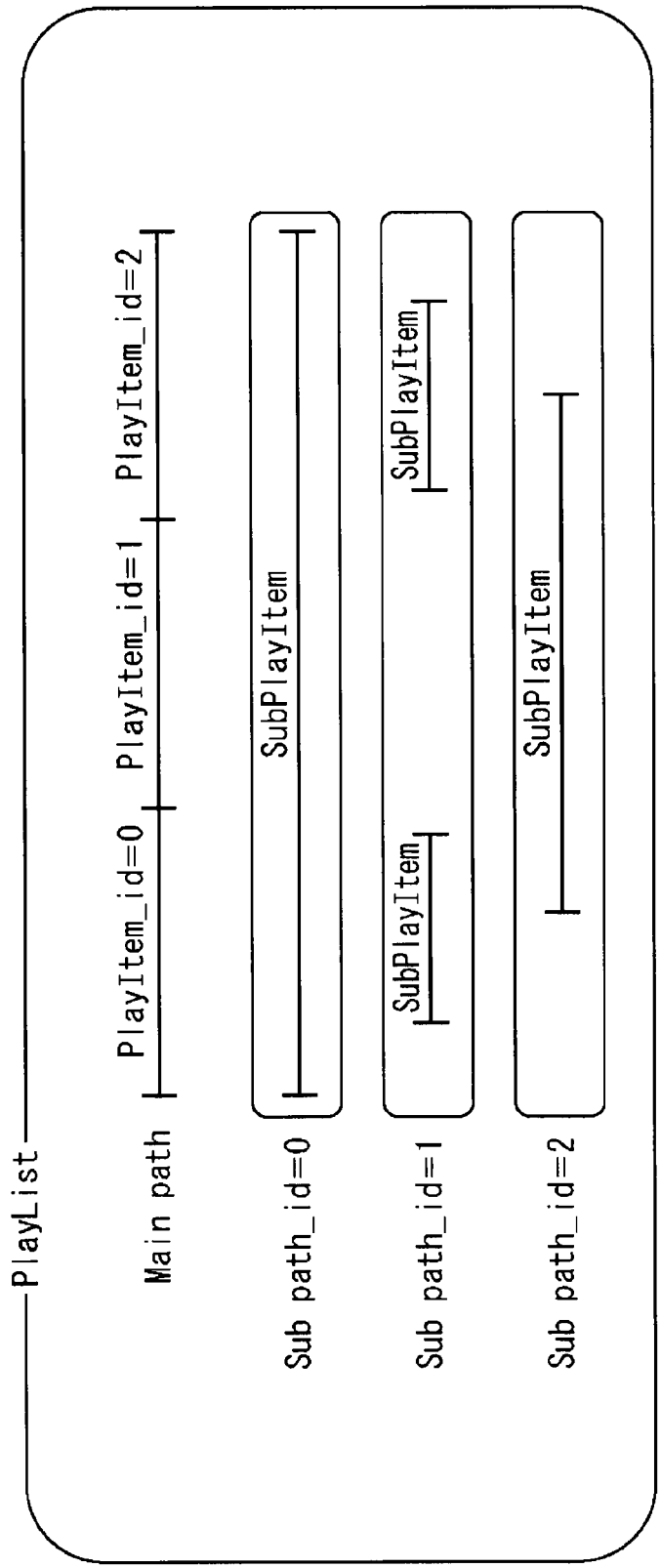
FIG. 10 is a diagram illustrating a structure of a Main Path and a Sub Path.

FIG. 10 is a diagram illustrating a structure of the main path and the sub path.

A PlayList can have one main path and one or more sub paths. The stream of the L view video mentioned above is referred to by a PlayItem constituting a main path. In addition, the stream of the R view video is referred to by a SubPlayItem constituting a sub path.

The PlayList in FIG. 10 has one main path constituted by an arrangement of three PlayItems and three sub paths. The PlayItems constituting the main path are set with IDs orderly from the beginning. The sub paths are also set with IDs.

In the example of FIG. 10, one SubPlayItem is included in the sub path of Subpath_id=0, and two SubPlayItems are included in the sub path of Subpath_id=1. In addition, one SubPlayItem is included in the sub path of Subpath_id=2.

The AV stream referred to by a certain PlayItem and the AV stream referred to by a SubPlayItem designating a playback zone of which time zone is overlapped with the PlayItem are synchronized and played back. The management of the AV stream using a PlayList, a PlayItem, and a SubPlayItem is described in, for example, Japanese Unexamined Patent Application Publication No. 2008-252740 and Japanese Unexamined Patent Application Publication No. 2005-348314.

Structure of Directory

Figure 11:
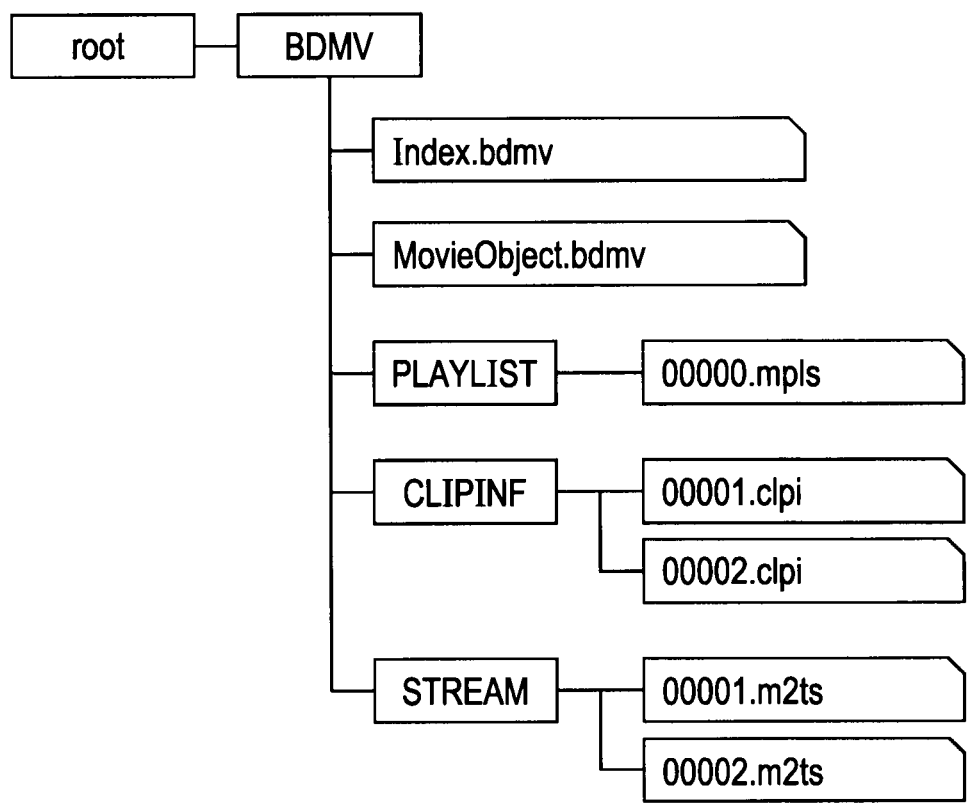
FIG. 11 is a diagram illustrating an example of a management structure of files which are recorded on an optical disc.

FIG. 11 is a diagram illustrating an example of a management structure of files which are recorded on the optical disc 2.

As shown in FIG. 11, files are managed hierarchically with the directory structure. One root directory is created on the optical disc 2. The lower part of the root directory is a range to be managed with one recording and playback system.

A BDMV directory is set below the root directory. An Index file, which is a file named as "Index.bdmv", and a MovieObject file, which is a file named as "MovieObject.bdmv", are accommodated just below the BDMV directory.

A PLAYLIST directory, a CLIPINF directory, and a STREAM directory are provided below the BDMV directory.

PlayList files, which are files describing a PlayList, are accommodated in the PLAYLIST directory. In each of PlayList files, a name made by combining a 5-digit number and an extension ".mpls" is set. In the PlayList file shown in FIG. 11, a file name of "00000.mpls" is set.

Clip Information files, which are files describing Clip Information, are accommodated in the CLIPINF directory. In each of the Clip Information files, a name made by combining a 5-digit number and an extension ".clpi" is set.

Two Clip Information files in FIG. 11 are set with file names of "00001.clpi" and "00002.clpi". Hereinafter, a Clip Information file is appropriately referred to as a clpi file.

A clip file of "00001.clpi" is a file describing information on the corresponding stream of L view video, and a clip file of "00002.clpi" is a file describing information on the corresponding stream of R view video.

Stream files are accommodated in the STREAM directory. In each of the stream files, a name made by combining a 5-digit number and an extension of ".m2ts" is set. Hereinafter, a file set with the extension of ".m2ts" is appropriately referred to as an m2ts file.

The m2ts file of "00001.m2ts" is a file of the L view video stream, and the m2ts file of "00002.m2ts" is a file of the R view video.

In addition to items shown in FIG. 11, a directory accommodating files of a stream of graphics of PG and IG or an audio stream is set below the BDMV directory.

Syntax of Each Data

FIG. 12 is a diagram illustrating the syntax of a PlayList file.

The PlayList file is a file set with the extension of ".mpls" accommodated in the PLAYLIST directory of FIG. 11.

The type_indicator in FIG. 12 indicates a kind of a file named "xxxxx.mpls".

The version_number indicates a version number of "xxxx.mpls". The version_number includes a 4-digit number. For example, a PlayList file for 3D playback in which a video is 3-dimensionally displayed is set with "0240" indicating "3D Spec version".

The PlayList_start_address indicates a base address of PlayList( ) with a unit of the number of relative bytes from the leading byte of the PlayList file.

The PlayListMark_start_address indicates a base address of PlayListMark( ) with a unit of the number of relative bytes from the leading byte of the PlayList file.

The ExtensionData_start_address indicates a base address of ExtensionData( ) with a unit of the number of relative bytes from the leading byte of the PlayList file.

In the AppInfoPlayList( ) a parameter relating to playback control of the PlayList, such as playback limit or the like, is accommodated.

In the PlayList( ), a parameter relating to a main path, a sub path or the like is accommodated.

In the PlayListMark( ), information is accommodated which is mark information of the PlayList, in other words, information about a mark, which is a jump point in a user operation or command instructing chapter jump or the like.

The ExtensionData( ) is configured such that private data can be inserted.

FIG. 13 is a diagram illustrating the syntax of the PlayList( ) of FIG. 12.

The length is a 32-bit unsigned integer indicating the number of bytes from the immediate next of the length field to the final end of the PlayList( ). In other words, the length indicates the number of bytes from the reserved_for_future_use to the final end of the PlayList.

The number_of_PlayItems is a 16-bit field indicating the number of PlayItems in the PlayList. In the case of the example in FIG. 10, the number of PlayItems is 3. The values of PlayItem_id are assigned from 0 in the order that the PlayItem( ) appears in the PlayList. For example, assigned values are PlayItem_id=0, 1, and 2 in FIG. 10.

The number_of_SubPaths is a 16-bit field indicating the number of sub paths in the PlayList. In the case of the example in FIG. 10, the number of sub paths is 3. The values of SubPath_id are assigned from 0 in the order that the SubPath( ) appears in the PlayList. For example, assigned values are Subpath_id=0, 1, and 2 in FIG. 10. In a for statement thereafter, the PlayItem( ) is referred to as many as the number of the PlayItems, and the SubPath( ) is referred to as many as the number of sub paths.

FIG. 14 is a diagram illustrating the syntax of the SubPath( ) in FIG. 13.

The length is a 32-bit unsigned integer indicating the number of bytes from the immediate next of the length field to the final end of the SubPath( ). In other words, the length indicates the number of bytes from the reserved_for_future_use to the final end of the PlayList.

The SubPath_type is an 8-bit field indicating a kind of application of the sub path. The SubPath_type is used, for example, for indicating the kind of the sub path, whether the sub path is audio, bitmap subtitles, or text subtitles.

The is_repeat_SubPath is a 1-bit field designating a method of playing back the sub Path, and indicates whether the playback of the sub Path should be repeated between the playback of the main Path or the playback of the sub Path should be performed once.

The number_of_SubPlayItems is an 8-bit field indicating the number of SubPlayItems (the number of entries) in one sub Path. For example, the number_of_SubPlayItems of the SubPlayItem of the SubPath_id=0 in FIG. 10 is 1, and the number_of_SubPlayItems of the SubPlayItem of the SubPath_id=1 is 2. In the for statement thereafter, the SubPlayItem( ) is referred to as many as the number of SubPlayItems.

FIG. 15 is a diagram illustrating the syntax of the SubPlayItem(i) in FIG. 14.

The length is a 16-bit unsigned integer indicating the number of bytes from the immediate next of the length field to the final end of the SubPlayItem( ).

The Clip_Information_file_name[0] indicates the name of a Clip Information file of the Clip that the SubPlayItem is referred to.

The Clip_codec_identifier[0] indicates a codec mode of the Clip.

The is_multi_Clip_entries is a flag indicating the existence of registration of a multi_Clip. When the flag of the is_multi_Clip_entries is set, the syntax for a case when the SubPlayItem refers to a plurality of Clips is referred to.

The ref_to STC_id[0] is information on an STC discontinuous point (a discontinuous point of a system time base).

The SubPlayItem_IN_time indicates a starting position of the playback zone of the sub Path, and the SubPlayItem_OUT_time indicates an ending position.

The sync_PlayItem_id and the sync_start_PTS_of_PlayItem indicate a time when the playback of the sub Path is started on the time axis of the main Path.

The SubPlayItem_IN_time, SubPlayItem_OUT_time, sync_PlayItem_id, and sync_start_PTS_of_PlayItem are used together in the Clip that the SubPlayItem refers to.

A case will be described where "if (is_multi_Clip_entries==1b" and where the SubPlayItem refers to a plurality of Clips.

The num_of_Clip_entries indicates the number of Clips to be referred to. The number of Clip_Information_file_name [SubClip_entry_id]s designates the number of Clips excluding the Clip_Information_file_name[0].

The Clip_codec_identifier[SubClip_entry_id] indicates a codec mode of the Clip.

The ref_to_STC_id[SubClip_entry_id] is information on an STC discontinuous point (a discontinuous point of a system time base).

FIG. 16 is a diagram illustrating the syntax of the PlayItem( ) in FIG. 13.

The length is a 16-bit unsigned integer indicating the number of bytes from the immediate next of the length field to the final end of the PlayItem( ).

The Clip_Information_file_name[0] indicates the name of the Clip Information file of the Clip that the PlayItem refers to. Furthermore, the file name of m2ts file including the Clip and the file name of Clip Information file corresponding thereto includes a same 5-digit number.

The Clip_codec_identifier[0] indicates a codec mode of the Clip. To the next of the Clip_codec_identifier[0], the reserved_for_future_use is included. To the next of the reserved_for_future_use, the is_multi_angle, and connection_condition are included.

The ref_to_STC_id[0] is information on an STC discontinuous point (a discontinuous point of a system time base).

The IN_time indicates a starting position of the playback zone of the PlayItem and the OUT_time indicates an ending position.

To the next of the OUT_time, the U0_mask_table( ), PlayItem_random_access_mode, and still_mode are included.

In the STN_table( ), a stream that the PlayItem refers to is included. In addition, when there is the sub Path played back in relation to the PlayItem, the information of a stream that the SubPlayItem constituting the sub Path refers to is also included.

FIG. 17 is a diagram illustrating the syntax of the STN_table( ) in FIG. 16.

The length is a 16-bit unsigned integer indicating the number of bytes from the immediate next of the length field to the final end of the STN_table( ).

The number_of_video_stream_entries indicates the number of streams that is given with the video_stream_id and gains an entry (registered) in the STN_table( ).

The video_stream_id is information for identifying a video stream. For example, the stream of the Base view video is specified by the video_stream_id. The ID of the stream of the Dependent view video may be defined in the STN_table( ) and in STN_table_SS( ) included in the ExtensionData( ) of the PlayList (FIG. 12) to be described later.

The number_of_audio_stream_entries gains an entry in the STN_table( ), and indicates the number of streams of the first audio stream given to the audio_stream_id. The audio_stream_id is information for identifying the audio stream.

The number_of_audio_stream2_entries gains an entry in the STN_table( ), and indicates the number of streams of the second audio stream given to the audio_stream_id2. The audio_stream_id2 is information for identifying the audio stream. In this example, the sound to be played back can be switched.

The number_of_PG_txtST_stream_entries gains an entry in the STN_table( ), and indicates the number of streams given to the PG_txtST_stream_id. Among these, the PG stream obtained by subjecting the bitmap subtitles to run-length encoding and a text subtitle file (txtST) gain entries. The PG_txtST_stream_id is information for identifying a stream of subtitles.

The number_of_IG_stream_entries gains an entry in the STN_table( ), and indicates the number of streams given to the IG_stream_id. Among these, the IG stream gains an entry. The IG_stream_id is information for identifying a stream of the IG.

In the stream_entry( ) prepared for each of the streams, PID information of a packet where data of each stream is accommodated. In addition, in the stream_attribute( ), attribute information of each stream is included.

FIG. 18 is a diagram illustrating an example of the syntax of STN_table_SS( ).

The STN_table_SS( ) is described, for example, in the ExtensionData( ) of a PlayList file (FIG. 12). In the STN_table_SS( ), when subtitles are displayed in the 3D subtitle mode or the aligned subtitle mode, information relating to the stream used in such display is included.

As shown in FIG. 18, each piece of information is set for each PG stream identified with a PG_textST_stream_id. For example, when a PG stream of each language such as the English, Japanese, or French language is recorded on the optical disc 2, the following information is set for the PG stream of each language.

The is_SS_PG indicates whether the PG stream for the 3D subtitle mode is recorded or not. For example, the fact that the value of is_SS_PG is 1 indicates that the PG stream of the 3D subtitle mode is recorded, and the fact that the value of is_SS_PG is 0 indicates that the PG stream of the 3D subtitle mode is not recorded.

The is_AS_PG indicates whether the PG stream for the aligned subtitle mode is recorded or not. For example, the fact that the value of is_AS_PG is 1 indicates that the PG stream of the aligned subtitle mode is recorded, and the fact that the value of is_AS_PG is 0 indicates that the PG stream of the aligned subtitle mode is not recorded.

The PG_textST_offset_id_ref indicates a target for reference of an offset value used when subtitles are displayed in the 3D subtitle mode.

In any display mode of the 3D subtitle mode and the aligned subtitle mode, to 3-dimensionally display the subtitles is performed by displaying the subtitles of a Base view and a Dependent view generated by setting a predetermined offset to subtitle data included in the PG stream. The value of the offset indicates a difference corresponding to parallax. For example, when a frame of a Base view where subtitles including same characters or symbols are arranged and a frame of a Dependent view overlap with each other, there is a difference in the positions of subtitles.

When there is a difference in the positions of the subtitles, the subtitles of the Base view are displayed together with the video of the Base view, and the subtitles of the Dependent view are displayed together with the video of the Dependent view, and accordingly, a user can 3-dimensionally see the subtitles in addition to the video. Furthermore, when the value of the offset applied to the subtitle data is 0, no parallax occurs, and thereby the subtitles are 2-dimensionally displayed.

The value of the offset referred by the PG_textST_offset_id_ref is included, for example, in the offset_metadata( ) described in the ExtensionData( ) of the PlayList file. Details of the offset_metadata( ) are disclosed in, for example, Japanese Patent Application Publication No. 2009-168806 by the present applicant.

In the stream_entry( ) described when the value of the is_AS_PG is 1, the PID information of a packet where data of the PG stream for the aligned subtitle mode is accommodated is included. In addition, in the stream_attribute( ), attribute information of the PG stream for the aligned subtitle mode is included.

The AS_PG_textST_offset_id_ref indicates a target for reference of a value of offset used when 3D subtitles are displayed in the aligned subtitle mode. For example, the value of the offset used when subtitles are displayed in the aligned subtitle mode is also included in the offset_metadata( ) described in the ExtensionData( ) of the PlayList file. The value of the offset can be included in a video stream encoded by MVC. In this case, the AS_PG_textST_offset_id_ref indicates that the value of the offset included in the video stream is referred to.

Furthermore, when the value of the is_SS_PG is 1, the stream_entry( ) that includes the PID information of a packet where the data of the PG stream for the 3D subtitle mode is accommodated and the stream_attribute( ) included in the attribute information may be described in the STN_table_SS( ).

FIG. 19 is a diagram illustrating an example of the syntax of active_video_window( ).

The active_video_window( ) is described, for example, in the ExtensionData( ) of the PlayList file (FIG. 12). The active_video_window( ) is described when the value of is_AS_PG included in the STN_table_SS( ) of FIG. 18 is 1 and the PG stream for the aligned subtitle mode is recorded.

In the active_video_window( ), information on the effective image frame of a video is included. A process of clipping out and moving the effective image frame of the video performed when subtitles are displayed in the aligned subtitle mode is carried out based on the description of the active_video_window( ).

Here, the top_offset, bottom_offset, top_align_flag, and align_offset will be described among the information included in the active_video_window( ).

The fixed_subtitle_window_0, fixed_subtitle_window_1, and flipped_AS_PG_textST_offset_id_ref are used for the flip function to be described later. The flip function moves an aligned subtitle area formed based on the value of top_offset or the like from the upper to the lower side or the lower to the upper side of a frame depending on a selection by a user.

The top_offset indicates a value used for acquiring an uppermost position of a pixel in the vertical direction of the effective image frame of a video.

Hereinafter, a position in a frame is indicated by using the number of pixels such that a position of one pixel in the left upper end of the frame is (x,y)=(0,0), in other words, the position of the pixel in the vertical direction in the first row from the top of the frame is 0, and the position of the pixel in the horizontal direction in the first column from the left of the frame is 0.

The TopOffset, which is a position of the uppermost pixel in the vertical direction of the effective image frame of the video is acquired by the equation (1) below by using a value of the top_offset.

$$TopOffset=2*top\_offset \quad (1)$$

The top_offset takes a value in the range indicated by the equation (2) below.

$$0 \leq top\_offset \leq ((FrameHeight/2)-bottom\_offset) \quad (2)$$

The FrameHeight of the equation (2) indicates the number of pixels in the vertical direction of the entire frame, and is acquired by equation (3) below using the pic_height_in_map_units_minus1 which is a parameter included in a video stream encoded with MVC.

$$FrameHeight=(16*(pic\_height\_in\_map\_units\_minus1+1))-8 \quad (3)$$

The bottom_offset indicates the value used for acquiring the position of a pixel in the vertical direction at the furthest bottom of the effective image frame. The BottomOffset, which is the position of a pixel in the vertical direction at the furthest bottom of the effective image frame, is acquired by equation (4) below using the value of the bottom_offset.

$$BottomOffset=FrameHeight-(2*bottom\_offset)-1 \quad (4)$$

Figure 20:
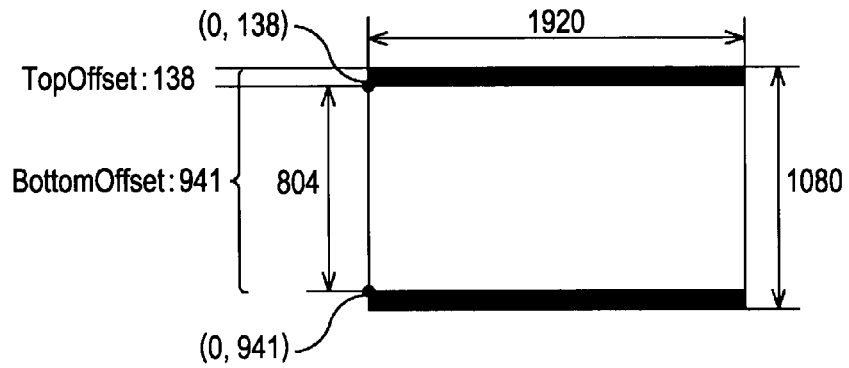
FIG. 20 is a diagram illustrating an example of TopOffset and BottomOffset.

FIG. 20 is a diagram illustrating an example of the TopOffset and the BottomOffset.

When the top_offset=69 and the bottom_offset=69, the TopOffset is acquired as 138 and the BottomOffset is acquired as 941 in the frame of 1920×1080 pixels. A position of one pixel in the left upper end of the effective image frame of the video is expressed by (x,y)=(0,138) and a position of one pixel in the left lower end is expressed by (x,y)=(0, 941).

The number of pixels in the vertical direction of the effective image frame is 804. 1080 is the value of the FrameHeight and acquired by the equation (3).

Returning to the description of FIG. 19, the top_align_flag indicates whether the effective image frame of the video is moved in the upper direction or the lower direction based on the position in the frame just after decoding. When the value of the top_align_flag is 1, it is indicated that the effective image frame is moved to the upper direction, and when the value of the top_align_flag is 0, it is indicated that the effective image frame is moved to the lower direction. A method of calculating the amount of movement using the align_offset differs depending on the value of the top_align_flag.

If the value of the top_align_flag is 1 and the effective image frame of the video is moved in the upper direction, the aligned subtitle area is formed in the lower side of the frame. In addition, if the value of the top_align_flag is 0 and the effective image frame of the video is moved in the lower direction, the aligned subtitle area is formed in the upper side of the frame.

The align_offset indicates a value used for acquiring the amount of movement of the effective image frame of the video.

When the value of the top_align_flag is 1, the AlignOffset, which is the amount of movement of the effective image frame of the video, is acquired by equation (5) below.

$$AlignOffset=2*align\_offset \quad (5)$$

When the value of the top_align_flag is 0, the AlignOffset, which is the amount of movement of the effective image frame of the video, is acquired by equation (6) below.

$$AlignOffset=2*(top\_offset+bottom\_offset-align\_offset) \quad (6)$$

The AlignOffset acquired by the equations (5) and (6) indicates the amount of movement in the lower direction with the number of pixels having the position of the pixel in the first row set to 0 from the top of the frame.

The align_offset takes a value in the range indicated by equation (7) below.

$$0 \leq align\_offset \leq (top\_offset+bottom\_offset) \quad (7)$$

The arrangement position as a target for movement of the effective image frame of the video in the frame is determined by the top_align_flag and the align_offset. In all pixels outside the effective image frame arranged in the determined position, a predetermined value of a pixel such as (Y,Cb,Cr)= (16,128,128) is set, and thereby the pixels outside the effective image frame in a frame become pixels having the same color.

Figure 21A:
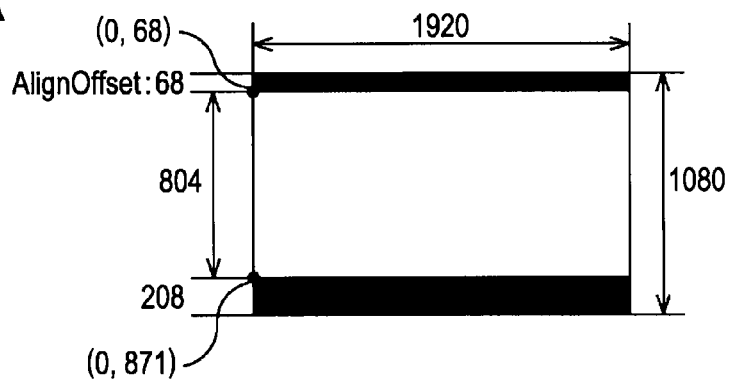
FIGS. 21A and 21B are diagrams illustrating examples of AlignOffset.
Figure 21B:
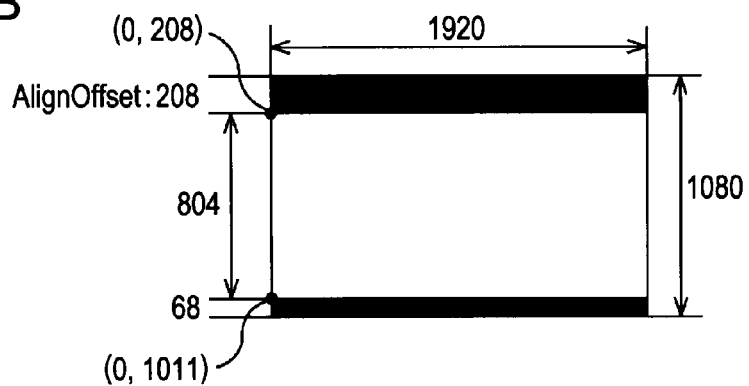

FIGS. 21A and 21B are diagrams illustrating examples of the AlignOffset.

When the value of the top_align_flag is 1 and align_offset=34, the AlignOffset is acquired as 68 in the frame of 1920×1080 pixels as shown in FIG. 21A. The position of one pixel in the left upper end of the effective image frame of the video is expressed by (x,y)=(0,68).

Since the AlignOffset is 68, the number of pixels in the vertical direction of the effective image frame of the video is 804, and the number of pixels in the vertical direction of the entire frame is 1080, the number of pixels in the vertical direction of the aligned subtitle area becomes 208. The position of one pixel in the left lower end of the effective image frame of the video is expressed by (x,y)=(0,871).

When the value of top_align_flag is 0 and align_offset=34, the AlignOffset is obtained as 208 in the frame of 1920×1080 as shown in FIG. 21B. The position of one pixel in the left lower end of the effective image frame is expressed by (x,y)= (0,208).

Since the AlignOffset is 208, the number of pixels in the vertical direction of the effective image frame of the video is 804 and the number of pixels in the vertical direction of the entire frame is 1080, the number of pixels in the vertical direction of the black area formed in the lower side of the frame becomes 68. The position of one pixel in the left lower end of the effective image frame of the video is expressed by (x,y)=(0,1011).

Example of Composition of Playback Device 1

Figure 22:
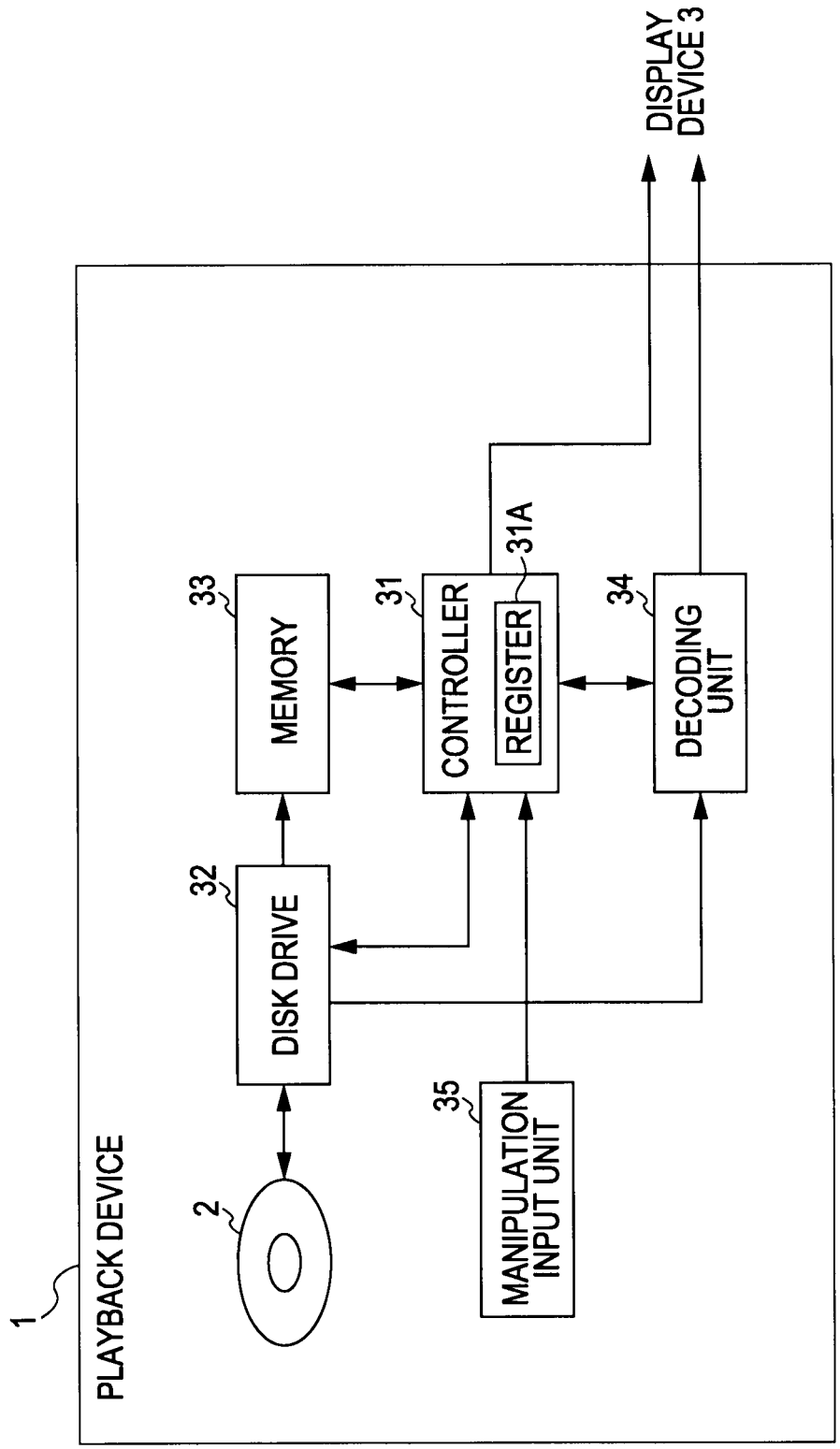
FIG. 22 is a block diagram illustrating an example of a composition of a playback device.

FIG. 22 is a block diagram illustrating an example of a composition of the playback device 1.

A controller 31 executes a control program (the disc navigation program in FIG. 9), and controls the operation of the entire playback device 1. The controller 31 switches the status of the playback device 1 according to the manipulation of a user, and causes the information indicating the current status to be stored in a register 31A.

A disk drive 32 reads out data from the optical disc 2 according to the control by the controller 31 and outputs the read data to the controller 31, a memory 33, or a decoding unit 34.

The memory 33 appropriately stores necessary data or the like in addition to the execution of various processes by the controller 31.

The decoding unit 34 decodes a stream supplied from the disk drive 32 and outputs obtained video signals to a display device 3. Audio signals are also output to the display device 3 via a predetermined path.

A manipulation input unit 35 is constituted with input devices such as a button, a key, a touch panel, a mouse or the like and receiving unit that receives signals such as infrared rays transmitted from a predetermined remote commander. The manipulation input unit 35 detects manipulation by a user and supplies a signal indicating the contents of the detected manipulation to the controller 31.

Figure 23:
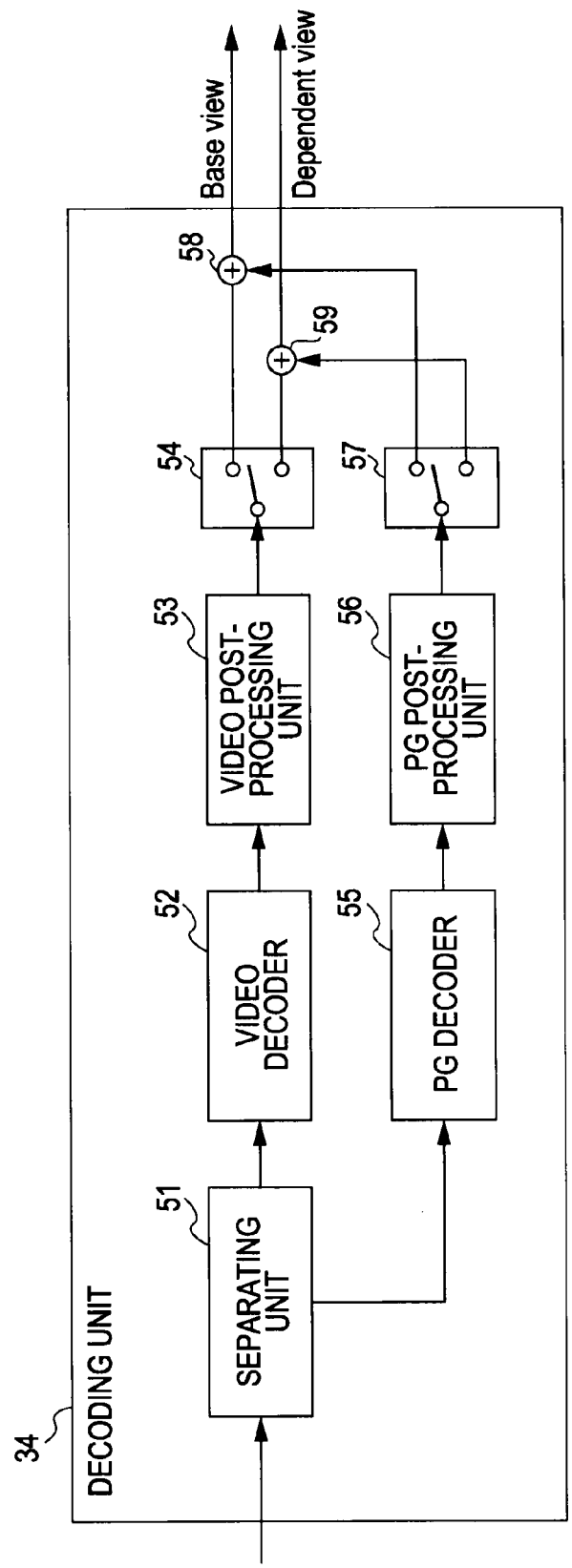
FIG. 23 is a diagram illustrating an example of a composition of a decoding unit.

FIG. 23 is a diagram illustrating an example of a composition of the decoding unit 34.

A separating unit 51 separates data multiplexed as TS supplied from the disk drive 32 according to the control by the controller 31. The separating unit 51 outputs a video stream to a video decoder 52, and outputs a PG stream to a PG decoder 55. In addition, FIG. 23 shows only the composition for processing data of a video and the composition for processing subtitle data, but such as composition for processing data of a video is also appropriately provided in the decoding unit 34.

A packet to accommodate the data of a video stream is specified, for example, based on PID included in the stream_entry( ) of the STN_table( ). In addition, a packet to accommodate the data of a PG stream for the 3D subtitle mode and a packet to accommodate the data of a PG stream for the aligned subtitle mode are specified, for example, based on PID included in the stream_entry( ) of the STN_table_SS( ).

The video decoder 52 decodes a video stream encoded in the MVC mode, and outputs image data (data of the Base view video and data of the Dependent view video) obtained by the decoding to a video post-processing unit 53.

The video post-processing unit 53 performs post-processing based on the description of the active_video_window( ) supplied from the controller 31 when subtitles are displayed in the aligned subtitle mode. The video post-processing unit 53 outputs a plane of the Base view video obtained by subjecting to the post-processing (image data with the same size as a frame) and a plane of the Dependent view video to a selecting unit 54.

The selecting unit 54 outputs the plane of the Base view video among the image data supplied from the video post-processing unit 53 to a synthesizing unit 58, and outputs the plane of the Dependent view video to a synthesizing unit 59.

The PG decoder 55 decodes a PG stream and outputs the subtitle data obtained by the decoding and information indicating a position of subtitle window to a PG post-processing unit 56.

When the subtitle data included in a PG stream is bitmap data, the PG stream includes window_vertical_position and window_horizontal_position which are items of information indicating the position of the subtitle window. With the 2 items of information, a position of a pixel, for example, in the left upper end of the subtitle window is designated in the frame. In addition, when the subtitle data included in the PG stream is text data, the PG stream includes region_vertical_position and region_height which are items of information indicating the position of the subtitle window.

The PG post-processing unit 56 performs post-processing based on the description of active_video_window( ) or STN_table_SS( ) supplied from the controller 31. The PG post-processing unit 56 outputs the plane of subtitles of Base view and the plane of subtitles of Dependent view obtained by subjecting to the post-processing to a selecting unit 57.

The selecting unit 57 outputs the plane of the subtitles of the Base view and the plane of the subtitles of the Dependent view, which are supplied from the PG post-processing unit 56, to the synthesizing units 58 and 59, respectively.

The synthesizing unit 58 generates the frame of the Base view by synthesizing the plane of the Base view video supplied from the selecting unit 54 and the plane of the subtitles of the Base view supplied from the selecting unit 57, and outputs. By synthesizing the plane of a video and plane of subtitles, the video is arranged within the effective image frame, and the data of one frame are generated which the subtitles are arranged in a predetermined position such as the aligned subtitle area.

The synthesizing unit 59 generates the frame of the Dependent view by synthesizing the plane of the Dependent view video supplied from the selecting unit 54 and the plane of the subtitles of the Dependent view supplied from the selecting unit 57, and outputs. Video signals of the frame of the Base view output from the synthesizing unit 58 and the frame of the Dependent view output from the synthesizing unit 59 are output to the display device 3.

Figure 24:
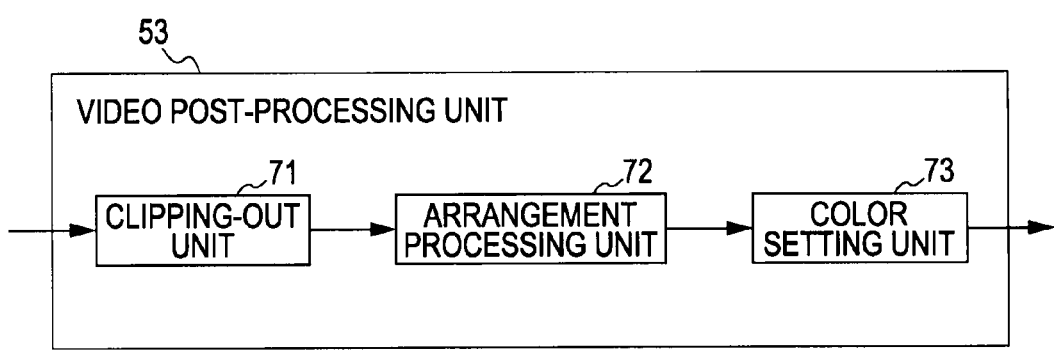
FIG. 24 is a block diagram illustrating an example of a composition of a video post-processing unit.

FIG. 24 is a block diagram illustrating an example of a composition of the video post-processing unit 53.

As shown in FIG. 24, the video post-processing unit 53 includes a clipping-out unit 71, an arrangement processing unit 72, and a color setting unit 73. To the clipping-out unit 71, the data of a frame as shown in FIG. 25A which has a composition that black areas are added in the upper and lower side of the effective image frame of a video, and are output from the video decoder 52 is input.

Figure 25A:
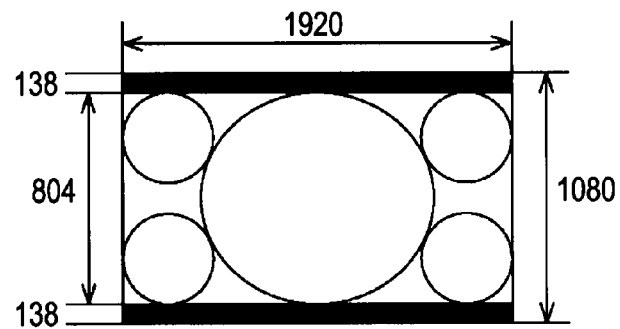
FIGS. 25A to 25D are diagrams illustrating examples of processing results by the video post-processing unit.

The frame shown in FIG. 25A is assumed to be a frame with a size of 1920×1080 pixels. The number of pixels in the vertical direction of the effective image frame of a video is 804, and in the upper and lower sides, black areas where the number of pixels in the vertical direction is 138 are set.

Figure 25B:
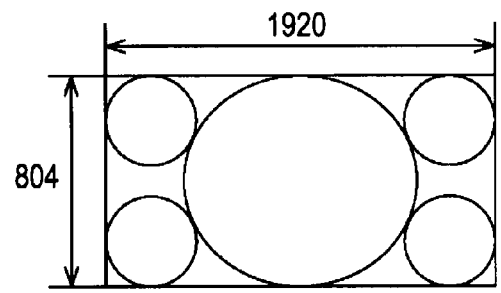

The clipping-out unit 71 acquires a TopOffset and a BottomOffset based on the top_offset and the bottom_offset included in the active_video_window( ), and clips out the effective image frame of a video. For example, the effective image frame of the video as shown in FIG. 25B is clipped out from the entire frame of the FIG. 25A.

The arrangement processing unit 72 acquires an arrangement position of the effective image frame of a video (a position of a target for movement based on a position in a frame after decoding) based on top_align_flag and align_offset included in the active_video_window( ), and arranges the effective image frame at the acquired position.

Figure 25C:
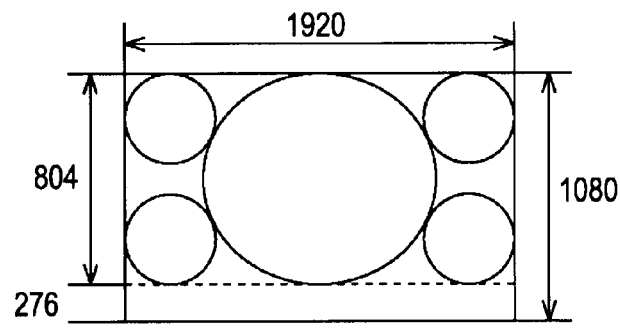

For example, as shown in FIG. 25C, the effective image frame is arranged so that the position of a pixel in the left upper end of the effective image frame of the video and the position of a pixel in the left upper end of the frame correspond to each other. As the position of the effective image frame of the video is moved, a space for the aligned subtitle area having the number of pixels in the vertical direction of 276 is secured which is obtained by joining black areas set in each of the upper and lower sides of the effective image frame of the video in the frame after decoding.

Figure 25D:
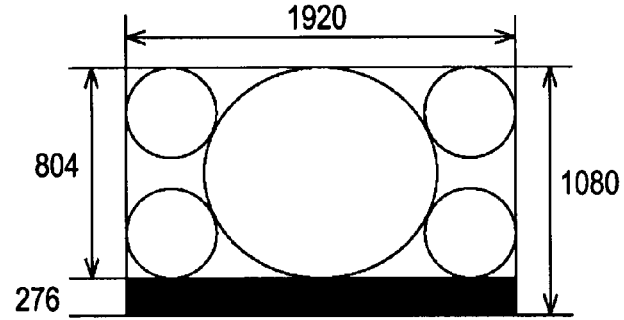

The color setting unit 73 sets a value indicating a predetermined color such as black or the like as the pixel value of a pixel outside the effective image frame of the video. Accordingly, as shown in FIG. 25D, the aligned subtitle area is formed in the lower side of the effective image frame of the video. Planes of the Base view video and the Dependent view video having the composition of the frame as shown in FIG. 25D are output to the selecting unit 54.

Figure 26:
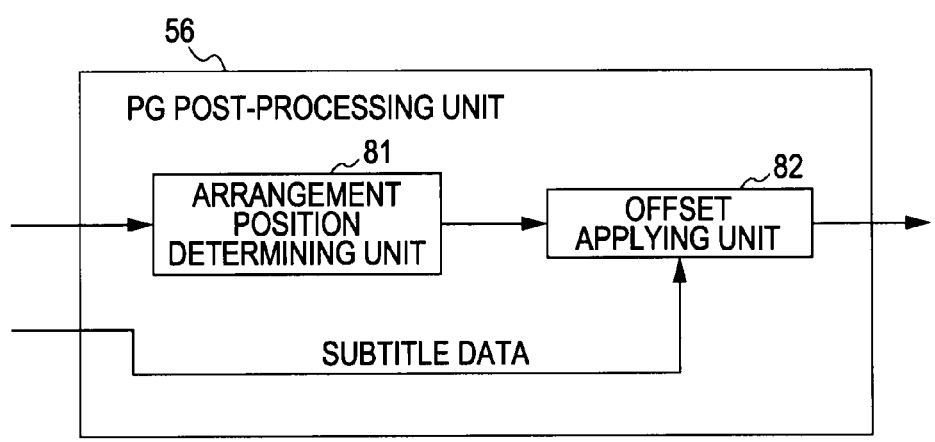
FIG. 26 is a block diagram illustrating an example of a composition of a PG post-processing unit.

FIG. 26 is a block diagram illustrating an example of a composition of the PG post-processing unit 56.

As shown in FIG. 26, the PG post-processing unit 56 includes an arrangement position determining unit 81 and an offset applying unit 82. The subtitle data output from the PG decoder 55 is input to the offset applying unit 82, and information such as window_vertical_position and window_horizontal_position indicating a position of a subtitle window is input to the arrangement position determining unit 81.

The arrangement position determining unit 81 determines the position of the subtitle window in the frame based on the input information and outputs the information indicating the position of the subtitle window to the offset applying unit 82.

The offset applying unit 82 sets parallax according to an offset value referred in PG_textST_offset_id_ref of the STN_table_SS( ) for the input subtitle data when the subtitles are displayed in the 3D subtitle mode, and generates the subtitle data of the Base view and the Dependent view.

Furthermore, the offset applying unit 82 sets parallax according to an offset value referred in AS_PG_textST_offset_id_ref of the STN_table_SS( ) for the input subtitle data when 3D subtitles are displayed in the aligned subtitle mode, and generates the subtitle data of the Base view and the Dependent view.

The offset applying unit 82 sets a subtitle window at a position determined by the arrangement position determining unit 81 and generates a plane of subtitles of the Base view by arranging the subtitles of the Base view within the subtitle window of the plane of the Base view.

Furthermore, the offset applying unit 82 generates the plane of subtitles of the Dependent view by arranging the subtitles of the Dependent view within the subtitle window of the plane of the Dependent view. The offset applying unit 82 outputs the generated planes to the selecting unit 57.

Operation of Playback Device

A process of setting a subtitle display mode in the playback device 1 will be described with reference to the flowchart of FIG. 27.

Figure 27:
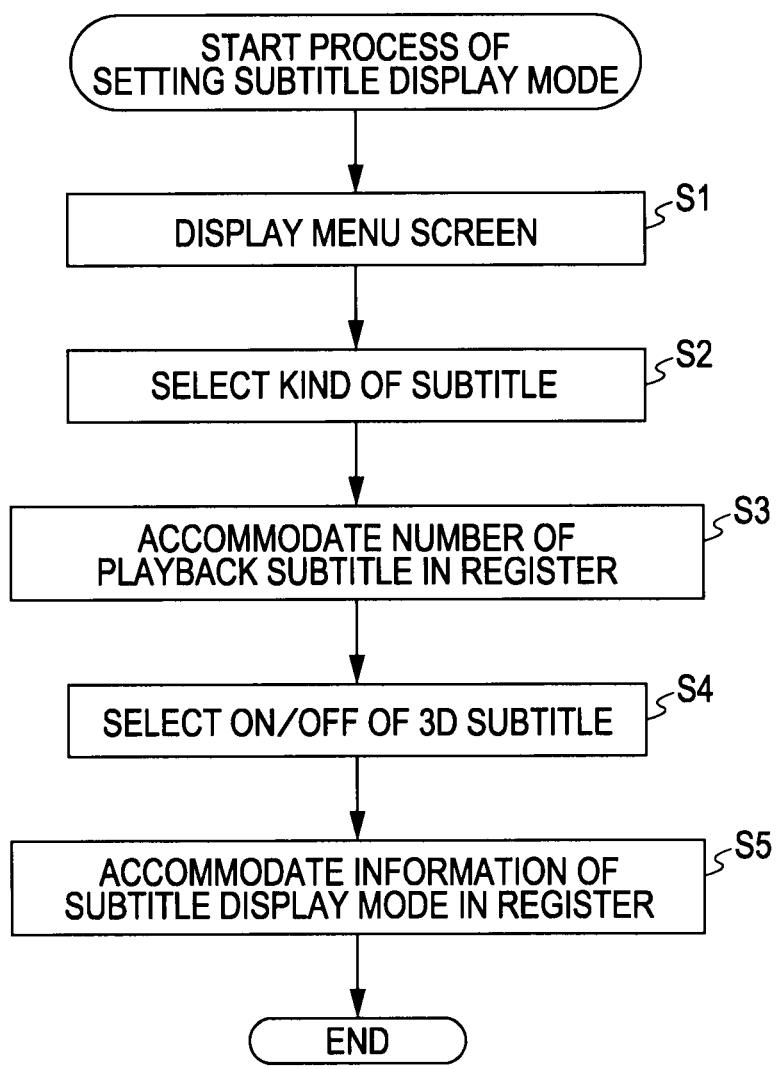
FIG. 27 is a flowchart describing a process of setting a subtitle display mode in a playback device.

The process of FIG. 27 is started when a user instructs the display of a menu screen relating to the subtitle display mode by, for example, manipulating a remote controller.

In Step S1, the controller 31 causes the display device 3 to display the menu screen relating to the subtitle display mode. The display of the menu screen is performed, for example, based on the data of IG stream recorded on the optical disc 2.

Figure 28:
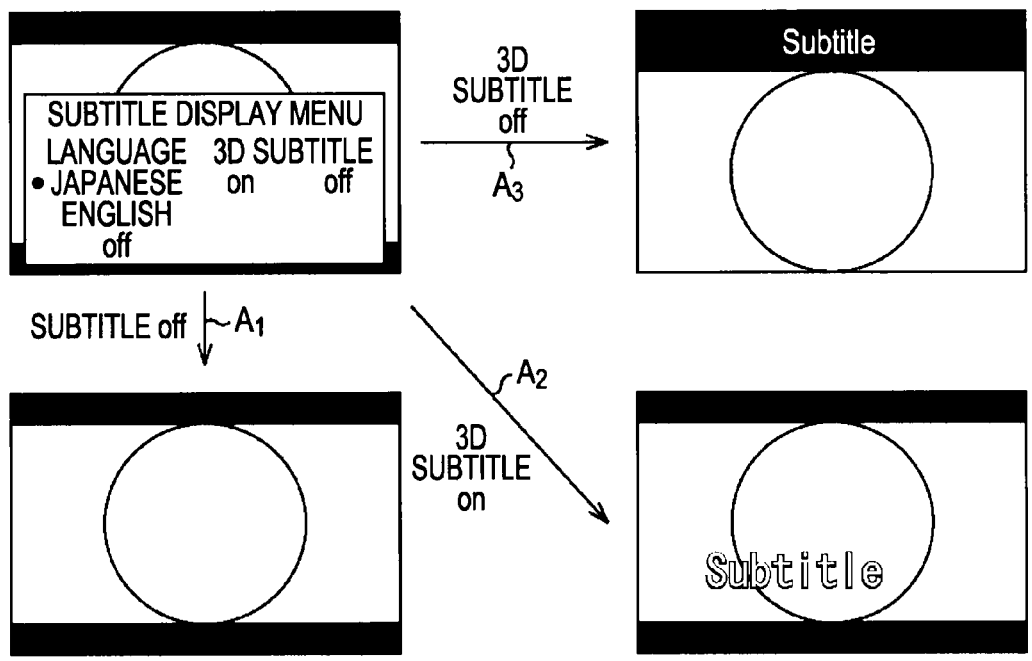
FIG. 28 is a diagram illustrating an example of a screen display.

FIG. 28 is a diagram illustrating an example of the screen display.

The screen shown in the left top of FIG. 28 is the menu screen relating to the subtitle display mode. In the example of FIG. 28, the menu screen is displayed by being overlapped with the video where black areas in the upper and lower side of the frame are added.

A user can select on/off of the subtitles, the language of the subtitles to be displayed, and on/off of the 3D subtitles when subtitles are to be displayed by manipulating a remote controller or the like. For example, when "off" (subtitle off) in the left bottom of the menu screen in FIG. 28 is selected, the video is 3-dimensionally displayed without the display of the subtitles as shown by the tip of the arrow $A_1$.

In Step S2 of FIG. 27, the controller 31 selects the kind of subtitles to be displayed (language) based on a signal supplied from the manipulation input unit 35.

In Step S3, the controller 31 accommodates information indicating the subtitle number selected as a playback target in the register 31A. For example, when "Japanese Language" is selected on the menu screen of FIG. 28, the information indicating the number for "Japanese" subtitles is accommodated in the register 31A. By the information accommodated in the register 31A, a PG stream of the language of the playback target is specified.

In Step S4, the controller 31 selects on/off of the 3D subtitles based on a signal supplied from the manipulation input unit 35. The on state of the 3D subtitles indicates the display mode of the subtitles is the 3D subtitle mode, and the off indicates the aligned subtitle mode.

In Step S5, the controller 31 accommodates information indicating the subtitle display mode in the register 31A according to the selection in Step S4. After the information indicating the subtitle display mode is accommodated in the register 31A, the process ends.

For example, when the on state of the 3D subtitles is selected on the menu screen of FIG. 28, the information indicating that the subtitle display mode is the 3D subtitle mode is accommodated in the register 31A, and after that, the subtitles are displayed in the 3D subtitle mode as shown by the tip of the arrow $A_2$. On the screen shown by the tip of the arrow $A_2$, subtitles, which are the characters of "Subtitle", are 3-dimensionally displayed within the effective image frame of a video together with the video.

On the other hand, when the off state of the 3D subtitles is selected on the menu screen of FIG. 28, the information indicating the subtitle display mode is the aligned subtitle mode is accommodated in the register 31A, and after that, the subtitles are displayed in the aligned subtitle mode as shown by the tip of the arrow $A_3$. On the screen shown by the tip of the arrow $A_3$, subtitles, which are characters of "Subtitle", are 3-dimensionally displayed in the aligned subtitle area formed in the upper side of the effective image frame of the video.

Next, the playback process of the playback device 1 will be described with reference to the flowchart of FIG. 29.

Figure 29:
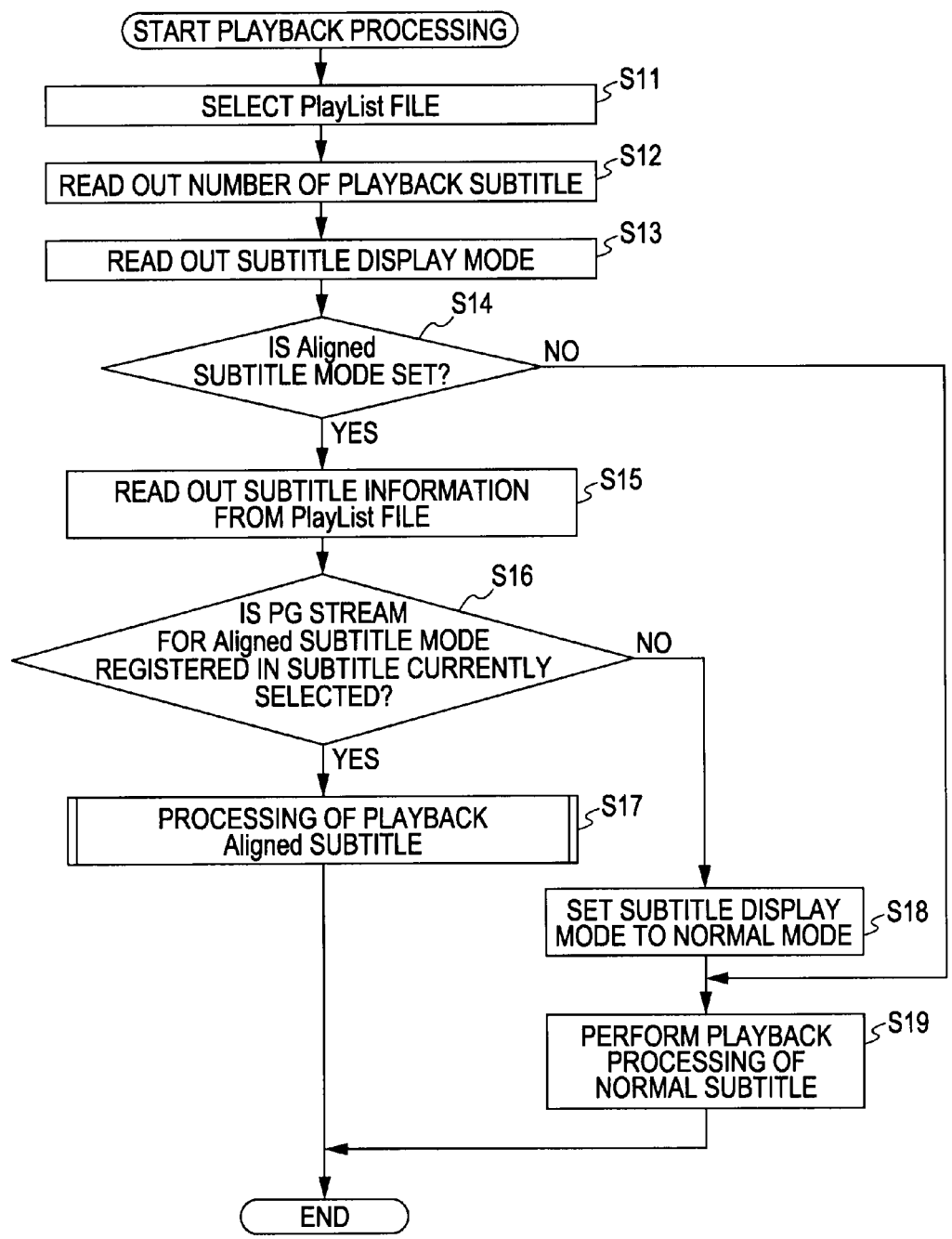
FIG. 29 is a flowchart describing a playback process of a playback device.

The process of FIG. 29 is started, for example, after the setting of a subtitle display mode from the menu screen is performed as shown in FIG. 28.

In Step S11, the controller 31 selects a PlayList file used in playing back contents.

In Step S12, the controller 31 reads out information indicating the subtitle number as a playback target accommodated in the register 31A.

In Step S13, the controller 31 reads out information indicating a subtitle display mode accommodated in the register 31A.

In Step S14, the controller 31 determines whether the aligned subtitle mode is set as the subtitle display mode or not based on the information read in the process in Step S13.

When it is determined that the aligned subtitle mode is set in Step S14, in Step S15, the controller 31 reads out information on subtitles from the PlayList file. As the information on subtitles, for example, the value of is_AS_PG, which is described in the STN_table_SS( ) and which relates to the subtitles of the language selected at present is read out.

In Step S16, the controller 31 determined whether a PG stream for the aligned subtitle mode is registered in the subtitle selected at present as a playback target. As described above, information of is_AS_PG or the like is set for each PG stream in the STN_table_SS( ). With respect to the selected language, there are cases where the PG stream for the aligned subtitle mode is recorded and not recorded.

Then the value of is_AS_PG is 1 and it is determined that the PG stream for the aligned subtitle mode is registered in Step S16, in Step S17, the controller 31 performs a playback process of the aligned subtitles. In the playback process of the aligned subtitles, the subtitles are displayed in the aligned subtitle mode as the video is 3-dimensionally displayed.

On the other hand, when the value of is_AS_PG is 0 and it is determined that the PG stream for the aligned subtitle mode is not registered in Step S16, in Step S18, the controller 31 sets a normal mode as a subtitle display mode. In the example of FIG. 28, since it is possible to select from the aligned subtitle mode and 3D subtitle mode, here, 3D subtitle mode is set as the subtitle display mode.

When the 3D subtitle mode is set in Step S18, or when the aligned subtitle mode is not set, in other words, the 3D subtitle mode is set in Step S14, a playback process of normal subtitles is performed in Step S19. In the playback process of normal subtitles, the PG stream for the 3D subtitle mode is read out from the optical disc 2, and decoding is performed by the PG decoder 55. In addition, the PG post-processing unit 56 generates subtitle data of the Base view and subtitles of the Dependent view, the subtitles are 3-dimensionally displayed within the effective image frame of a video together with the video.

Figure 1:
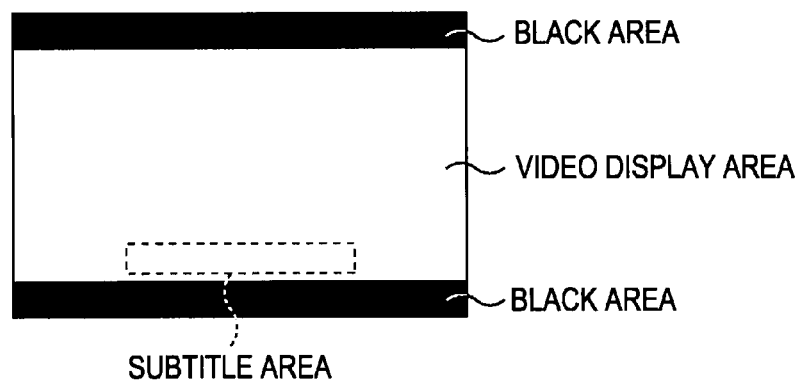
FIG. 1 is a block diagram illustrating an example of a composition of a frame in related art.

Furthermore, when a mode in which subtitles are 2-dimensionally displayed in the area (area represented by dotted line in FIG. 1) set in the lower part within the effective image frame of the video is prepared, the playback process of the subtitles may be performed in the mode, as a playback process of normal subtitles.

Figure 30:
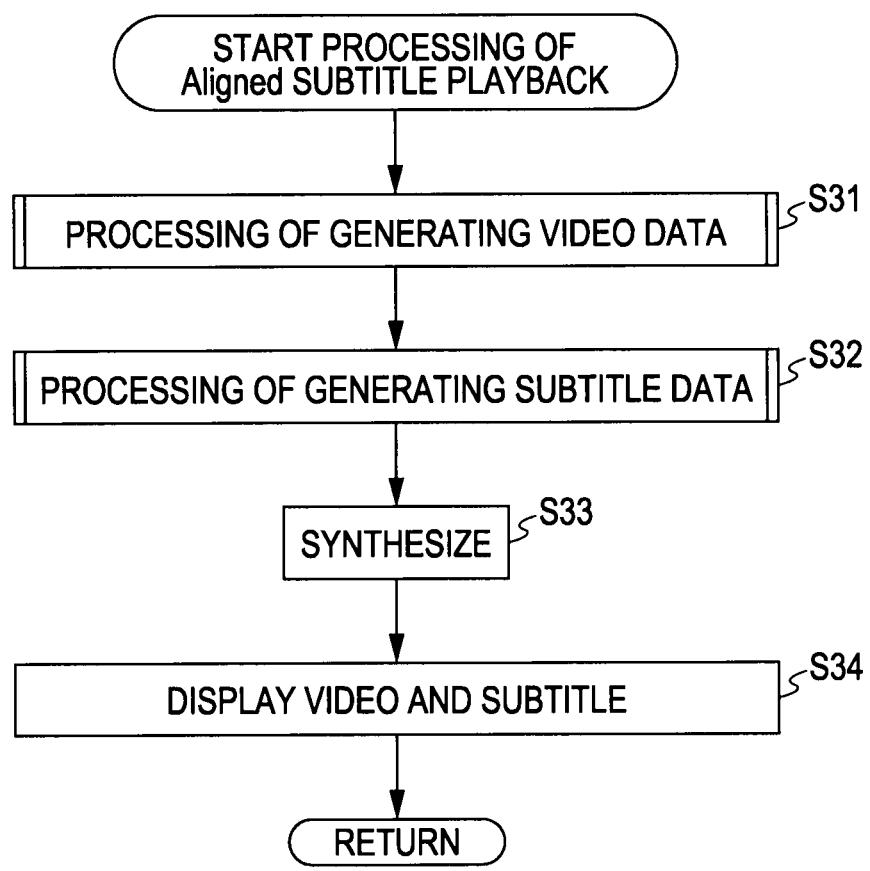
FIG. 30 is a flowchart describing a playback process of aligned subtitles performed in Step S17 of FIG. 29.

Next, the playback process of the aligned subtitles performed in Step S17 of FIG. 29 will be described with reference to the flowchart of FIG. 30.

In Step S31, a process of generating video data is performed. By the process of generating video data, the plane of the Base view video and the plane of the Dependent view video having the composition that the aligned subtitle area are formed in a predetermined position.

In Step S32, a process of generating subtitle data is performed. By the process of generating subtitle data, the plane of the subtitles of the Base view and the plane of the subtitles of the Dependent view where the subtitles are arranged in a position corresponding to the aligned subtitle area generated by the process of generating the video data are generated.

In Step S33, the synthesizing unit 58 generates the frame of the Base view by synthesizing the plane of the Base view video and the plane of the subtitles of the Base view. In addition, the synthesizing unit 59 generates the frame of the Dependent view by synthesizing the plane of the Dependent view video and the plane of the subtitles of the Dependent view.

In Step S34, the controller 31 outputs the frame of the Base view and the frame of the Dependent view to the display device 3, and displays a screen where the subtitles are displayed in the aligned subtitle area.

Next, a process of generating the video data performed in Step S31 of FIG. 30 will be described with reference to the flowchart of FIG. 31.

The process is started after the video stream as a target to be decoded and the PG stream for the aligned subtitle mode are read out from the optical disc 2 based on the description of the PlayList file selected in Step S11 of FIG. 29, and the streams are separated by the separating unit 51. The video stream separated by the separating unit 51 is supplied to the video decoder 52, and the PG stream for the aligned subtitle mode is supplied to the PG decoder 55.

In Step S41, the video decoder 52 decodes the video stream and outputs the image data obtained by the decoding to the video post-processing unit 53.

In Step S42, the controller 31 reads out the information described in the active_video_window( ) as information of the effective image frame of the video from the PlayList file. The information described in the active_video_window( ) read out by the controller 31 is supplied to the video post-processing unit 53.

In Step S43, the clipping-out unit 71 of the video post-processing unit 53 (FIG. 24) acquires the TopOffset and the BottomOffset based on the top_offset and the bottom_offset included in the active_video_window( ) and clips out the effective image frame of the video.

In Step S44, an arrangement processing unit 72 acquires an arrangement position of the effective image frame of the video based on the top_align_flag and the align_offset included in the active_video_window( ), and arranges the effective image frame at the acquired position.

In Step S45, a color setting unit 73 sets a value indicating a predetermined color such as black or the like as a pixel value of a pixel outside the arranged effective image frame and generates the aligned subtitle area.

The planes of the Base view video and the Dependent view video where the aligned subtitle area is formed are output to the selecting unit 54. In the selecting unit 54, the plane of the Base view video is output to the synthesizing unit 58 and the plane of the Dependent view video is output to the synthesizing unit 59. After that, the process returns to Step S31 of FIG. 30 and processing thereafter is performed.

Next, a process of generating subtitle data performed in Step S32 of FIG. 30 will be described with reference to the flowchart of FIG. 32.

In Step S51, the PG decoder 55 decodes the PG stream for the aligned subtitle mode, and outputs the subtitle data to the offset applying unit 82 of the PG post-processing unit 56 and the information indicating the position of the subtitle window to an arrangement position determining unit 81.

In Step S52, the arrangement position determining unit 81 determined the position of the subtitle window in the frame based on the information supplied from the PG decoder 55.

In Step S53, the offset applying unit 82 sets parallax according to the offset value referred in the AS_PG_textST_offset_id_ref of the STN_table_SS( ) for the subtitle data, and generates the subtitle data of the Base view and the Dependent view. The offset applying unit 82 arranges the subtitle window at the position determined by the arrangement position determining unit 81, and generates the planes of the subtitles of the Base view and the Dependent view by arranging the subtitles within the subtitle window.

The planes of the subtitles of the Base view and the Dependent view generated by the offset applying unit 82 are output to the selecting unit 57. In the selecting unit 57, the plane of the subtitles of the Base view is output to the synthesizing unit 58, and the plane of the subtitles of the Dependent view is output to the synthesizing unit 59. After that, the process returns to Step S32 of FIG. 30 and processing thereafter is performed.

By the process described above, a sufficient area can be secured as a display area of subtitles, and subtitle display easily seen by a user can be realized.

Regarding Flip Function

FIG. 33 is a diagram illustrating an example of modification in a composition of a frame realized by the flip function.

As described above, the flip function moves the position of the aligned subtitle area formed based on the information included in the active_video_window( ) according to the selection of a user.

The left side of the FIG. 33 shows the frame when the value of the top_align_flag is 1 and the align_offset=34. The composition of the frame shown in the left side of FIG. 33 is the same composition as that described with reference to FIG. 21A, and the aligned subtitle area is formed in the lower side of the frame.

As described with reference to FIG. 21A, AlignOffset of the frame having 1920×1080 pixels shown in the left side of FIG. 33 is 68, the number of pixels in the vertical direction of the effective image frame of the video is 804, and the number of pixels in the vertical direction in the aligned subtitle area is 208. In addition, the position of one pixel in the left lower end of the effective image frame of the video is expressed by (x,y)=(0,871).

In the frame shown in the left side of FIG. 33, the position of one pixel in the left upper end of the subtitle window is expressed by (x,y)=(640,891), and the number of pixels in the vertical direction of the subtitle window is 168. The difference in the vertical direction between the lower end of the effective image frame of the video and the upper end of the subtitle window is 20 pixels (891-871 pixels). In addition, the position of the subtitle window is determined by information such as the window_vertical_position and window_horizontal_position included in the PG stream. In the PG stream, information indicating the number of pixels in the vertical direction of the subtitle window is also included.

In this case, when it is instructed that the aligned subtitle area is moved in the upper side of the frame, as shown by the tip of the white-inversed arrow, the composition of the frame is modified so that the aligned subtitle area is formed in the upper side of the frame. In other words, while maintaining the size of each area, the aligned subtitle area is arranged in the upper side of the effective image frame of the video and the black area is arranged in the lower side of the effective image frame.

As shown in the right side of FIG. 33, the position of one pixel in the left upper end of the subtitle window is expressed by (x,y)=(640,20) in the frame after the movement of the aligned subtitle area.

FIG. 34 is a diagram illustrating another example of the modification of the frame composition.

The left side of FIG. 34 shows the frame when the value of the top_align_flag is 0 and the align_offset=34. The composition of the frame shown in the left side of FIG. 34 is the same composition as that described with reference to FIG. 21B, and the aligned subtitle area is formed in the upper side of the frame.

As described with reference to FIG. 21B, the AlignOffset of the frame shown in the left side of FIG. 34 is 208, the number of pixels in the vertical direction of the effective image frame of the video is 804, and the number of pixels in the vertical direction of the aligned subtitle area is 68.

In the frame shown in the left side of FIG. 34, the position of one pixel in the left upper end of the subtitle window is expressed by (x,y)=(640,20), and the number of pixels in the vertical direction of the subtitle window is 168.

In this case, when it is instructed that the aligned subtitle area is moved in the lower side of the frame, as shown by the tip of the white-inversed arrow, the composition of the frame is modified so that the aligned subtitle area is formed in the lower side of the frame. In other words, while maintaining the size of each area, the aligned subtitle area is arranged in the lower side of the effective image frame of the video and the black area is arranged in the upper side of the effective image frame.

As shown in the right side of FIG. 34, the position of one pixel in the left upper end of the subtitle window is expressed by (x,y)=(640,891) in the frame after the movement of the aligned subtitle area.

The position of the effective image frame of the video is rearranged by the arrangement processing unit 72 of the video post-processing unit 53, the color setting unit 73 sets a predetermined pixel value in a pixel outside the rearranged effective image frame, and thereby, such modification of the position of each area is performed.

By using the flip function, users can modify the position of the aligned subtitle area according to their tastes. The playback device 1 maintains the distance between the subtitle window and the effective image frame within the aligned subtitle area even when the position of the aligned subtitle area is modified, and the subtitles may not be separated from the effective image frame.

Figure 35:
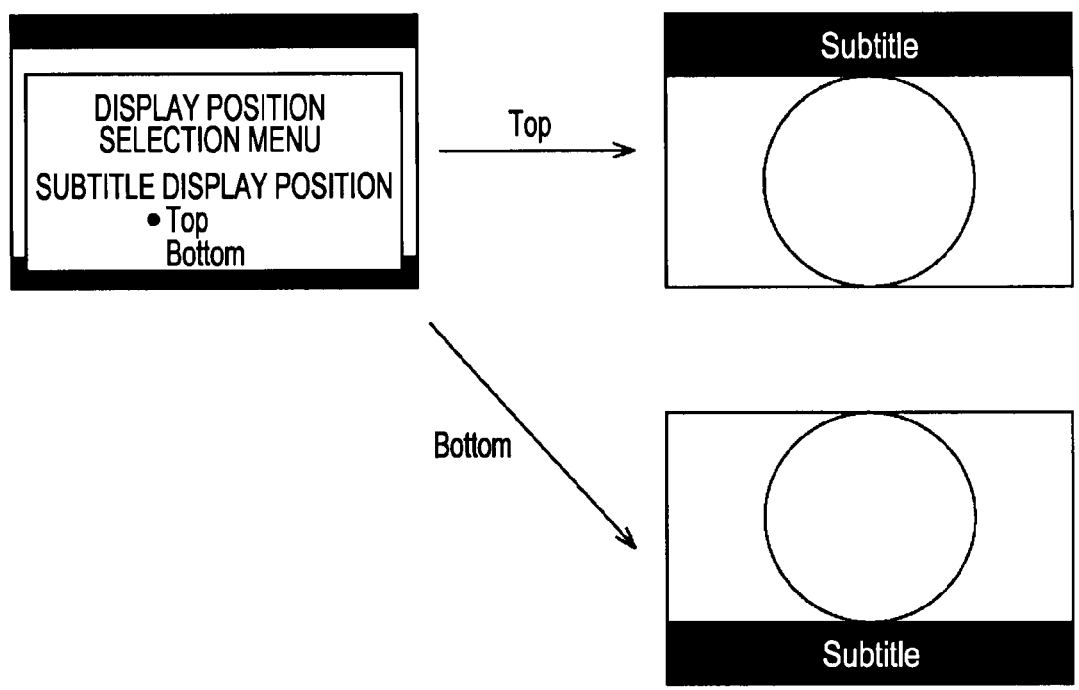
FIG. 35 is a diagram illustrating an example of a menu screen for selecting an aligned subtitle area.

FIG. 35 is a diagram illustrating an example of a menu screen used for selecting the position of the aligned subtitle area.

On the menu screen shown in the left side of FIG. 35, it is possible to select whether the position of the aligned subtitle area is to be in the upper side (top) of the frame or the lower side (bottom) of the frame. For example, when the position of the aligned subtitle area and the opposite position arranged based on the information included in the active_video_window( ) are selected, the aligned subtitle area is moved by the flip function.

Figure 36:
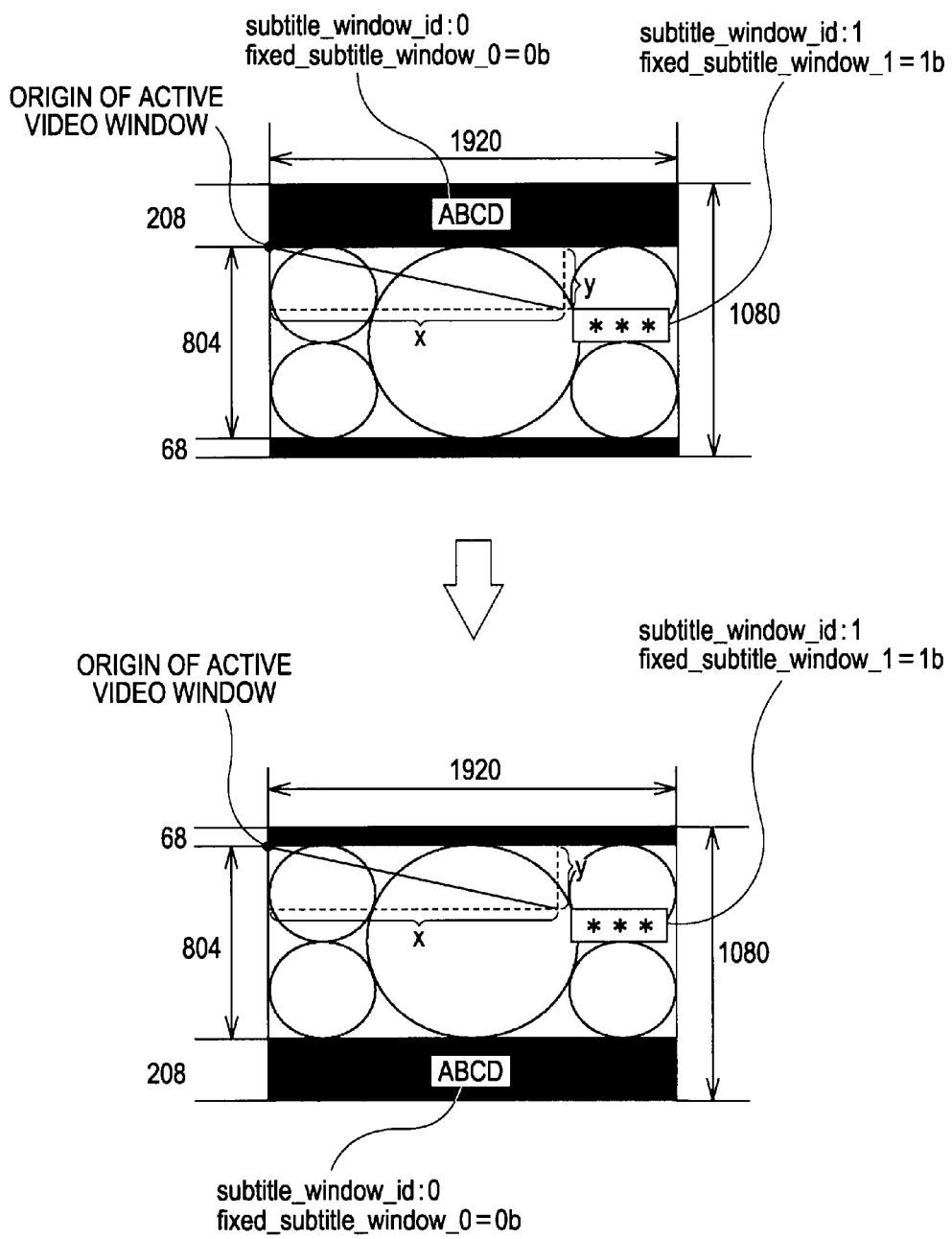
FIG. 36 is a diagram describing fixed_subtitle_window_0 and fixed_subtitle_window_1.

FIG. 36 is a diagram describing fixed_subtitle_window_0 and fixed_subtitle_window_1 included in the active_video_window( ) of FIG. 18.

As described above, it is possible to set the subtitle window for displaying subtitles of contents of conversation between characters and the subtitles window for displaying compulsory subtitles. In addition, the subtitle window for displaying the compulsory subtitles is possible to be arranged within the effective image frame of the video. The arrangement position of each of the subtitle windows is designated by the information included in the PG stream.

Even when the frame composition is modified by the flip function, the fixed_subtitle_window_0 and the fixed_subtitle_window_1 are used in order to arrange the subtitle window for displaying the compulsory subtitles at the position where the author intends.

Even when the position of the effective image frame of the video is moved by the flip function, the fixed_subtitle_window_0 indicates whether the relationship between the position of the effective image frame of the video and the position of the subtitle window #0 identified by ID=0 is to be maintained. For example, the fact that the value of the fixed_subtitle_window_0 is 1 indicates that the relationship between the position of the effective image frame of the video and the position of the subtitle window #0 is to be maintained, and the fact that the value of the fixed_subtitle_window_0 is 0 indicates that the relationship between the position of the effective image frame of the video and the position of the subtitle window #0 is not to be maintained.

In the same way, even when the position of the effective image frame of the video is moved by the flip function, the fixed_subtitle_window_1 indicates whether the relationship between the position of the effective image frame and the position of the subtitle window #1 identified by ID=1 is to be maintained. For example, the fact that the value of the fixed_subtitle_window_1 is 1 indicates that the relationship between the position of the effective image frame of the video and the position of the subtitle window #1 is to be maintained, and the fact that the value of the fixed_subtitle_window_1 is 0 indicates that the relationship between the position of the effective image frame of the video and the position of the subtitle window #1 is not to be maintained.

In the frame shown in the left side of FIG. 36, the aligned subtitle area is arranged in the upper side of the frame. In addition, the subtitle window #0 identified by ID=0 is arranged in the aligned subtitle area, and subtitles including alphabets of "ABCD" are displayed in the subtitle window #0. The value of the fixed_subtitle_window_0 of the subtitle window #0 is 0.

Furthermore, in the frame shown in the left side of FIG. 36, the subtitle window #1 identified by ID=1 is arranged in the effective image frame of the video, and the subtitles of "****" are displayed in the subtitle window #1. The value of the fixed_subtitle_window_1 of the subtitle window #1 is 1. The pixel of the left upper end of the subtitle window #1 is at the position as far as x pixels in the horizontal direction and y pixels in the vertical direction based on the pixel in the left upper end of the effective image frame of the video.

In this case, when it is instructed that the aligned subtitle area is to be moved in the lower side of the frame, the frame composition is modified as shown in the right side of FIG. 36. According to the modification of the frame composition, the subtitle window #0 is arranged in the aligned subtitle area after the movement.

Since the value of the fixed_subtitle_window_0 of the subtitle window #0 is 0, the relationship between the position of the effective image frame of the video and the position of the subtitle window #0 is not maintained before and after the position of the aligned subtitle area is moved by the flip function.

On the other hand, since the value of the fixed_subtitle_window_1 is 1, the subtitle window #1 is arranged so that its positional relationship with the position of the effective image frame of the video is maintained.

In the frame shown in the right side of FIG. 36, the pixel of the left upper end of the subtitle window #1 is at the position as far as x pixels in the horizontal direction and y pixels in the vertical direction based on the pixel in the left upper end of the effective image frame of the video. The relationship between the position of the effective image frame of the video and the position of the subtitle window #1 does not change before and after the position of the aligned subtitle area is moved.

Accordingly, even when the position of the effective image frame of the video is moved by the flip function, the subtitle window for displaying the compulsory subtitles can be arranged at the position that the author intends.

Furthermore, the flipped_AS_PG_textST_offset_id_ref of FIG. 19 indicates a target for reference of the offset value used when 3D subtitles are displayed in the aligned subtitle area after movement in the case where the position of the aligned subtitle area is moved by the flip function. In the example of FIG. 19, it is possible to refer to one flipped_AS_PG_textST_offset_id_ref for the active_video_window( ), but it may be possible to employ the syntax referring to a different flipped_AS_PG_textST_offset_id_ref for each PG stream.

The offset value used when the 3D subtitles are displayed in the aligned subtitle area before the movement is referred to by AS_PG_textST_offset_id_ref (FIG. 18) of the STN_table_SS( ), but the offset value used when the 3D subtitles are displayed in the aligned subtitle area after the movement is referred to by a different flipped_AS_PG_textST_offset_id_ref.

Accordingly, the subtitle of the aligned subtitle area before the movement and the subtitle of the aligned subtitle area after the movement by the flip function can be 3-dimensionally displayed by using different offset values. Since the offset value can be changed, the author can make variations in the spatial effects that the audience feels with the subtitle of the aligned subtitle area before the movement and the subtitle of the aligned subtitle area after the movement.

Modified Example of Syntax

As the PG stream for the aligned subtitle mode, the PG stream of the subtitles displayed in the aligned subtitle area arranged in the upper side of the frame and the PG stream of the subtitles displayed in the aligned subtitle area arranged in the lower side can be recorded in the optical disc 2 respectively.

FIG. 37 is a diagram illustrating another example of the syntax of the STN_table_SS( ).

In the STN_table_SS( ) of FIG. 37, the description of the PG stream of the subtitles displayed in the aligned subtitle area arranged in the upper side of the frame and the PG stream of the subtitles displayed in the aligned subtitle area arranged in the lower side is included.

The is_top_AS_PG_TextST indicates whether the PG stream of the subtitles displayed in the aligned subtitle area arranged in the upper side of the frame is recorded. For example, the fact that the value of the is_top_AS_PG_TextST is 1 indicates that the PG stream of the subtitles displayed in the aligned subtitle area arranged in the upper side of the frame is recorded, and the fact that the value of the is_top_AS_PG_TextST is 0 indicates that the PG stream of the subtitles displayed in the aligned subtitle area arranged in the upper side of the frame is not recorded.

The is_bottom_AS_PG_TextST indicates whether the PG stream of the subtitles displayed in the aligned subtitle area arranged in the lower side of the frame is recorded. For example, the fact that the value of the is_bottom_AS_PG_TextST is 1 indicates that the PG stream of the subtitles displayed in the aligned subtitle area arranged in the lower side of the frame is recorded, and the fact that the value of the is_bottom_AS_PG_TextST is 0 indicates that the PG stream of the subtitles displayed in the aligned subtitle area arranged in the lower side of the frame is not recorded.

In the stream_entry( ) described when the value of is_top_AS_PG_TextST is 1, the PID of the packet accommodating the data of the PG stream of the subtitles displayed in the aligned subtitle area arranged in the upper side of the frame is included. In addition, in the stream_attribute( ) the attribute information of the PG stream of the subtitles displayed in the aligned subtitle area arranged in the lower side of the frame is included. The top_AS_PG_textST_offset_sequence_id_ref indicates a target for reference of the offset value used when the subtitles are 3-dimensionally displayed in the aligned subtitle area arranged in the upper side of the frame.

In the stream_entry( ) described when the value of the is_bottom_AS_PG_TexST is 1, the PID of the packet accommodating the data of the PG stream of the subtitles displayed in the aligned subtitle area arranged in the lower side of the frame is included. In addition, in the stream_attribute( ), the attribute information of the PG stream of the subtitles displayed in the aligned subtitle area arranged in the lower side of the frame is included. The bottom_AS_PG_textST_offset_sequence_id_ref indicates a target for reference of the offset value used when the subtitles are 3-dimensionally displayed in the aligned subtitle area arranged in the lower side of the frame.

A process that uses STN_table_SS( ) of FIG. 37 will be described. Repetitive description as above will be appropriately omitted.

Hereinbelow, PG stream of subtitles displayed in the aligned subtitle area arranged in the upper side of the frame is appropriately referred to as PG stream for aligned subtitles in the upper side, and PG stream of subtitles displayed in the aligned subtitle area arranged in the lower side of the frame is appropriately referred to as PG stream for aligned subtitles in the lower side.

When the playback process of FIG. 29 is performed by using the STN_table_SS( ) of FIG. 37, values of is_top_AS_PG_TextST and is_bottom_AS_PG_TextST for subtitles of the language which is selected at present, which are described in the STN_table_SS( ), are read in Step S15.

Furthermore, in Step S16, it is determined whether a PG stream for the aligned subtitle mode is registered or not in the subtitle selected at present as a playback target.

Then the value of is_top_AS_PG_TextST or is_bottom_AS_PG_TextSt is 1 and it is determined that the PG stream for the aligned subtitle mode is registered in Step S16, in Step S17, a playback process of the aligned subtitles is performed. In the playback process of the aligned subtitles, the subtitles are displayed in the aligned subtitle mode as the video is 3-dimensionally displayed.

For example, when both of the PG stream for aligned subtitles in the upper side and the PG stream for aligned subtitles in the lower side are recorded on the optical disc 2 (when the values of is_top_AS_PG_TextST and is_bottom_AS_PG_TextST are 1), the PG stream selected by a user is played back.

Figure 32:
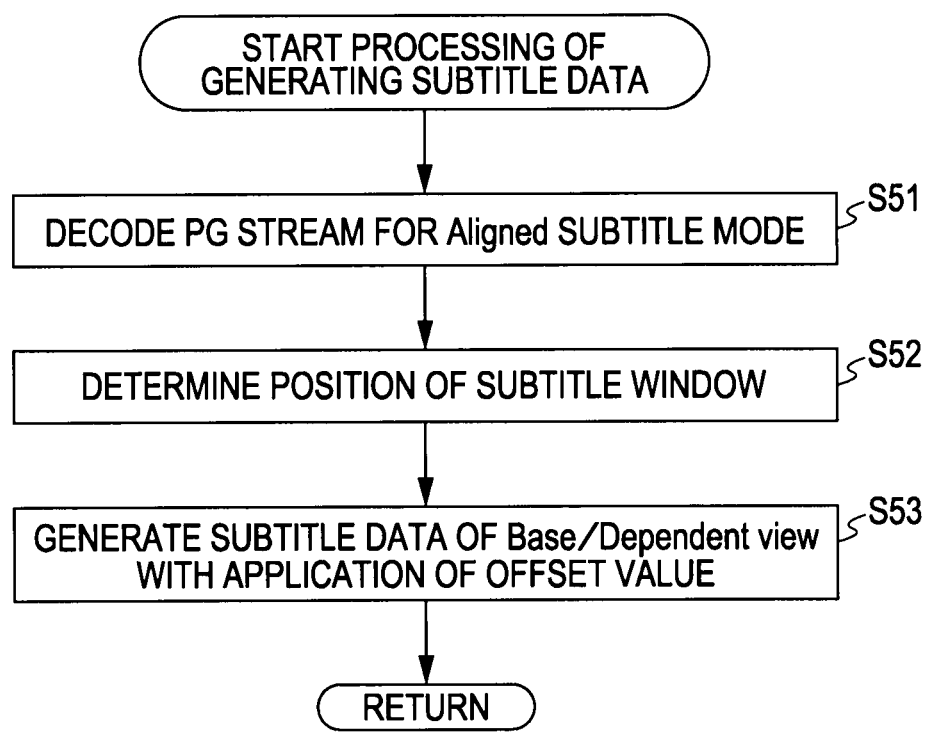
FIG. 32 is a flowchart describing a process of generating subtitle data performed in Step S32 of FIG. 30.

In Step S53 of the subtitle data generating process in FIG. 32 for the PG stream for aligned subtitles in the upper side as a target, parallax is set according to an offset value referred to in top_AS_PG_textST_offset_sequence_id_ref for the subtitle data obtained by decoding the PG stream.

In addition, in Step S53 of the subtitle data generating process in FIG. 32 for the PG stream for aligned subtitles in the lower side as a target, parallax is set according to an offset value referred to in bottom_AS_PG_textST_offset_sequence_id_ref for the subtitle data obtained by decoding the PG stream.

Accordingly, the author of the content can prepare the PG stream for aligned subtitles in the upper side and the PG stream for aligned subtitles in the lower side according to the video content. In addition, since different values can be set as offset values, the author of the content can change a three-dimensional effect with subtitles displayed in the aligned subtitle area arranged in the upper side of the frame and subtitles displayed in the aligned subtitle area arranged in the lower side of the frame.

FIG. 38 is a diagram illustrating an example of another syntax of active_video_window( ).

The active_video_window( ) of FIG. 38 is described when the value of either is_top_AS_PG_TestST or is_bottom_AS_PG_TestST included in STN_table_SS( ) of FIG. 37 is 1 and, the PG stream for aligned subtitle mode is recorded.

In the example of FIG. 38, the top_align_flag described with reference to FIG. 19 is not included. In addition, top_align_offset and bottom_align_offset are included therein instead of align_offset.

Top_offset is a value obtained by expressing the width of the black frame area (the number of pixels in the vertical direction) formed in the upper side of the frame in a 2-pixel unit. That the value of the top_offset is, for example, 69 indicates that the width of the black frame area formed in the upper side of the frame is 138 pixels. The top_offset is used for acquiring a position of an uppermost pixel in the vertical direction of the effective image frame of video.

Hereinafter, a position in a frame is indicated by using the number of pixels such that a position of one pixel in the left upper end of the frame is (x,y)=(0,0), in other words, the position of the pixel in the vertical direction in the first row from the top of the frame is 0, and the position of the pixel in the horizontal direction in the first column from the left of the frame is 0.

The TopOffset, which is a position of the uppermost pixel in the vertical direction of the effective image frame of the video is acquired by the equation (8) below by using a value of the top_offset.

$$\text{TopOffset} = 2 \ast \text{top\_offset} \tag{8}$$

The top_offset takes a value in the range indicated by equation (9) below.

$$0 \leq \text{top\_offset} \leq ((\text{FrameHeight}/2) - (\text{bottom\_offset} + 1)) \tag{9}$$

The FrameHeight in equation (9) indicates the number of pixels in the vertical direction of the entire frame, and is obtained by equation (10) below. Pic_height_in_map_units_minus1, frame_mbs_only_flag, frame_crop_top_offset, and frame_crop_bottom_offset of the equation (10) are all parameters included in the video stream encoded with MVC.

$$\begin{aligned}\text{FrameHeight} = &16 \ast (\text{pic\_height\_in\_map\_units\_minus1} + \\ &1) \ast (2 - \text{frame\_mbs\_only\_flag}) - 2 \ast (2 - \text{frame\_mbs\_only\_flag}) \ast (\text{frame\_crop\_top\_offset} + \\ &\text{frame\_crop\_bottom\_offset})\end{aligned} \tag{10}$$

Bottom_offset is a value obtained by expressing the width of the black frame area (the number of pixels in the vertical direction) formed in the lower side of the frame in a 2-pixel unit. That the value of the bottom_offset is, for example, 69 indicates that the width of the black frame area formed in the lower side of the frame is 138 pixels. The bottom_offset is used for acquiring a position of the downmost pixel in the vertical direction of the effective image frame of video.

The BottomOffset, which is a position of the downmost pixel in the vertical direction of the effective image frame of the video, is acquired by the equation (11) below by using a value of the bottom_offset.

$$\text{BottomOffset} = \text{FrameHeight} - (2 \ast \text{bottom\_offset}) \tag{11}$$

Top_align_offset is a value obtained by expressing a position of a pixel in the upper left end in the vertical direction of the effective image frame of the video, which is re-arranged, in a 2-pixel unit, having the upper left end of the frame as the point of origin (0,0). The top_align_offset is used for obtaining a position of the re-arrangement of the effective image frame of the video when the value of is_top_AS_PG_TextST is 1 and subtitles are displayed by playing back the PG stream for aligned subtitles in the upper side.

The top_align_offset takes a value in the range indicated by equation (12) below.

$$\text{Top\_offset} \leq \text{top\_align\_offset} \leq \text{top\_offset} + \text{bottom\_offset} \tag{12}$$

AlignOffset, which is a position of the uppermost pixel in the vertical direction of the effected image frame of the re-arranged video, is obtained by equation (13) below by using a value of top_align_offset.

$$\text{AlignOffset} = 2 \ast \text{top\_align\_offset} \tag{13}$$

Figure 39A:
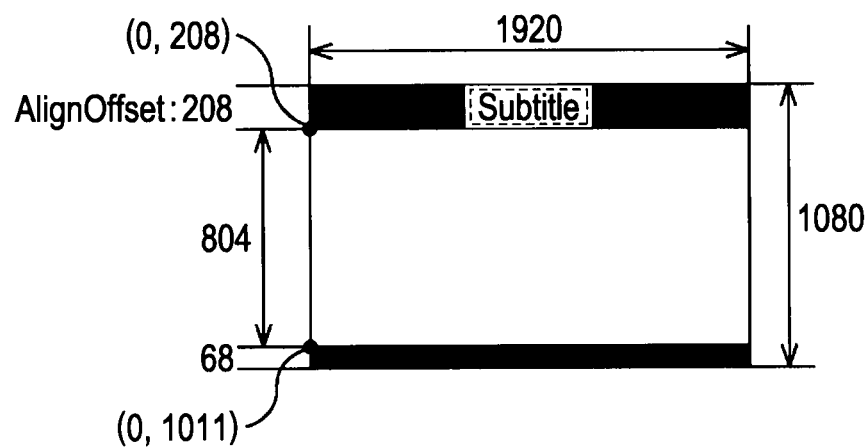
FIGS. 39A and 39B are diagrams illustrating examples of AlignOffset.

FIG. 39A is a diagram illustrating an example of AlignOffset obtained by using a value of top_align_offset.

When top_align_offset=104 as shown in FIG. 39A, the AlginOffset is obtained to be 208 for a frame of 1920×1080 pixels. The position of one pixel in the upper left end of the effective image frame of the video is expressed by (x,y)=(0, 208).

Figure 39B:
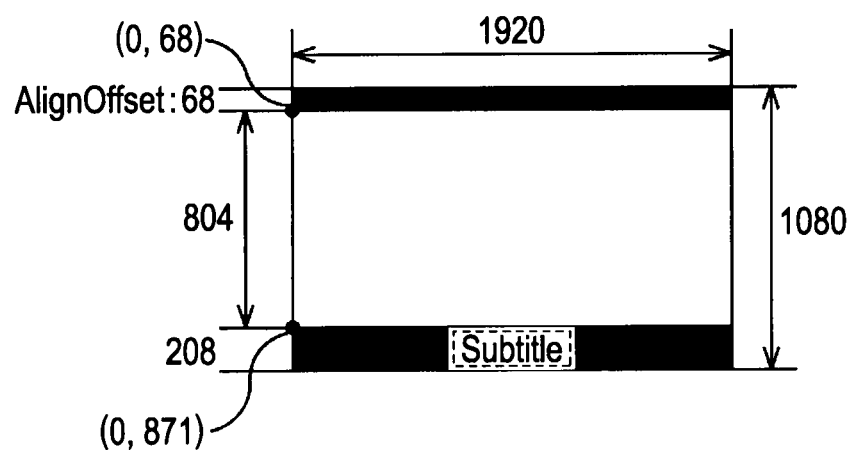

In the examples of FIGS. 39A and 39B, the widths of the black frame areas in the upper and lower sides of the frame right after decoding are 138 as described with reference to FIG. 20. The values of the top_offset and the bottom_offset are 69.

Returning to the description of FIG. 38, the bottom_align_offset is a value obtained by expressing the position of the pixel in the upper left end in the vertical direction of the effective image frame of the video, which is re-arranged, in a 2-pixel unit, having the upper left end of the frame as the point of origin (0,0). The bottom_align_offset is used for obtaining a position of the re-arrangement of the effective image frame of the video when the value of is_bottom_AS_PG_TextST is 1 and subtitles are displayed by playing back the PG stream for aligned subtitles in the lower side.

The bottom_align_offset takes a value in the range indicated by equation (14) below.

$$0 \leq \text{bottom\_align\_offset} \leq \text{top\_offset} \quad (14)$$

AlignOffset, which is a position of the downmost pixel in the vertical direction of the effected image frame of the rearranged video, is obtained by equation (15) below by using a value of bottom_align_offset.

$$\text{AlignOffset} = 2 * \text{bottom\_align\_offset} \quad (15)$$

FIG. 39B is a diagram illustrating an example of AlignOffset obtained by using the bottom_align_offset.

When bottom_align_offset=34 as shown in FIG. 39B, the AlginOffset is obtained to be 68 for a frame of 1920×1080 pixels. The position of one pixel in the upper left end of the effective image frame of the video is expressed by (x,y)=(0, 68).

A process using the active_video_window( ) of FIG. 38 will be described. Repetitive description as above will be appropriately omitted.

Figure 31:
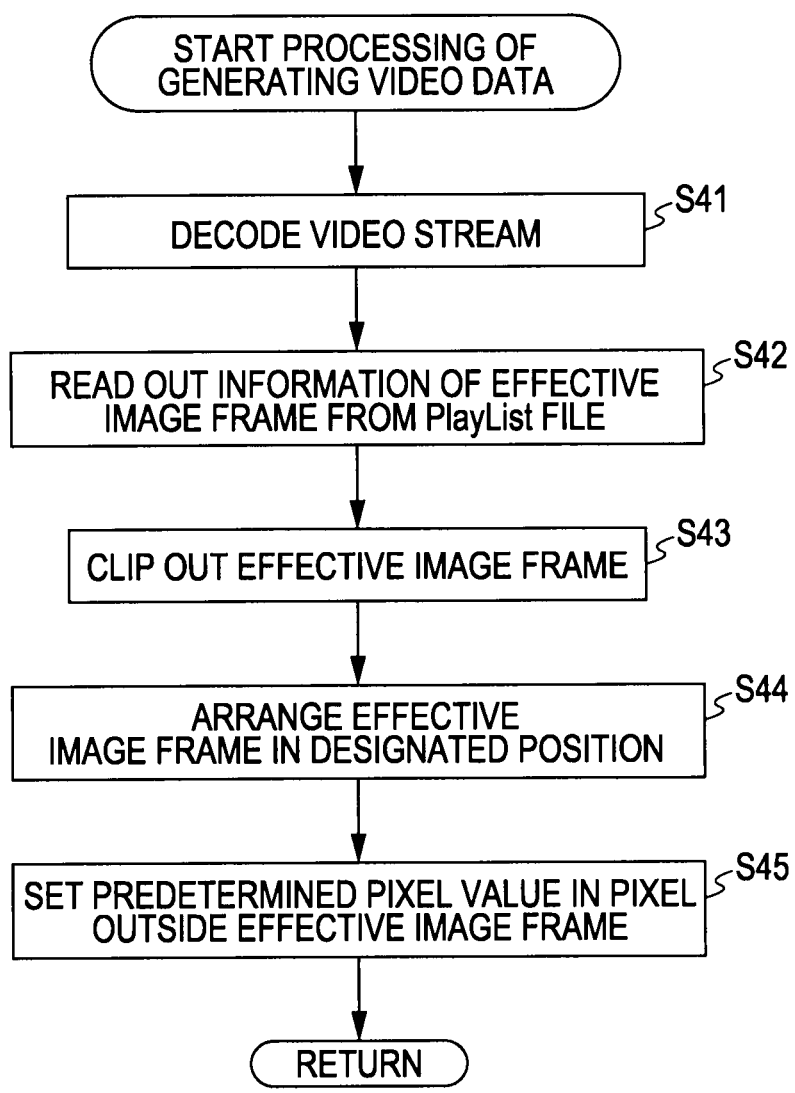
FIG. 31 is a flowchart describing a process of generating video data performed in Step S31 of FIG. 30.

When the video data generating process of FIG. 31 is performed by using the active_video_window( ) of FIG. 38, information described in the active_video_window( ) is read from a PlayList file in Step S42.

In Step S43, TopOffset and BottomOffset are obtained based on the top_offset and the bottom_offset and the effective image frame of the video is clipped.

In Step S44, an arrangement position of the effective image frame of the video is obtained and the effective image frame is arranged in the obtained position.

For example, when a value of is_top_AS_PG_TextST is 1 and subtitles are displayed by playing back the PG stream for aligned subtitles in the upper side, the arrangement position is obtained as described with reference to FIG. 39A by using the top_align_offset.

On the other hand, when a value of is_bottom_AS_PG_TextST is 1 and subtitles are displayed by playing back the PG stream for aligned subtitles in lower upper side, the arrangement position is obtained as described with reference to FIG. 39B by using the bottom_align_offset.

After that, the PG stream for aligned subtitles in the upper side and the PG stream for aligned subtitles in the lower side are decoded, and subtitles are displayed in the aligned subtitle area.

Composition and Operation of Information Processing Device

Figure 40:
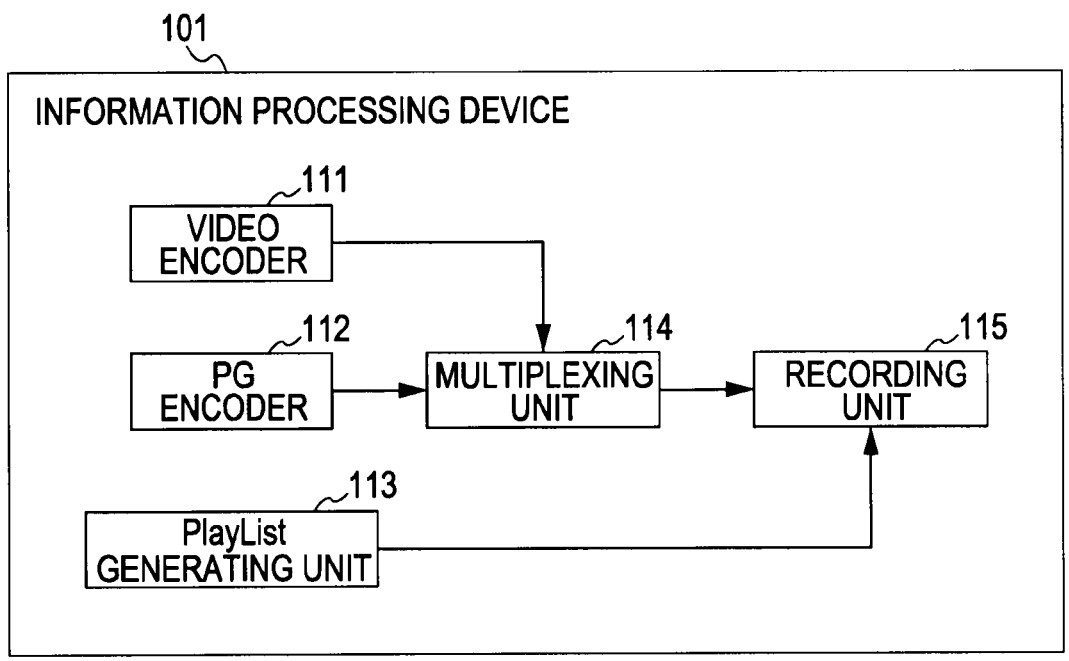
FIG. 40 is a block diagram illustrating an example of a composition of an information processing device.

FIG. 40 is a block diagram illustrating an example of a composition of an information processing device 101.

In the information processing device 101, contents to be played back by the playback device 1 are generated and recorded in a recording medium such as BD or the like. The recording medium on which the contents are recorded by the information processing device 101 is provided to the playback device 1 as an optical disc 2.

As shown in FIG. 40, the information processing device 101 is constituted with a video encoder 111, a PG encoder 112, a PlayList generating unit 113, a multiplexing unit 114, and a recording unit 115.

The video encoder 111 has the same configuration as the MVC encoder of FIG. 3. The video encoder 111 encodes input video data in the MVC mode, and outputs a stream of Base view video and a stream of Dependent view video to the multiplexing unit 114.

The PG encoder 112 encodes data of input subtitles and outputs a PG stream for the 3D subtitle mode and a PG stream for the aligned subtitle mode to the multiplexing unit 114.

The PlayList generating unit 113 generates a PlayList file including the information described above, and outputs it to the multiplexing unit 114.

The multiplexing unit 114 multiplexes the stream of the Base view video, the stream of the Dependent view video supplied from the video encoder 111, and the PG stream supplied from the PG encoder 112, and outputs TS to the recording unit 115.

The recording unit 115 generates contents including the TS supplied from the multiplexing unit 114 and the PlayList file generated by the PlayList generating unit 113, and records the data of the contents on a recording medium such as BD or the like.

Figure 41:
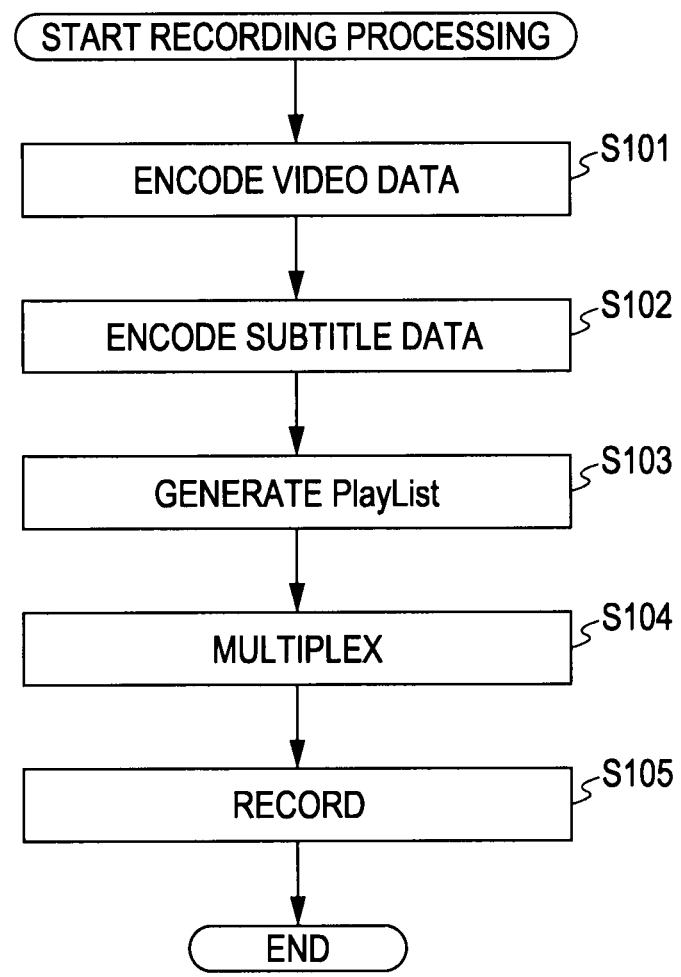
FIG. 41 is a flowchart describing a recording process of the information processing device.

A recording process of the information processing device 101 will be described with reference to the flowchart of FIG. 41.

In Step S101, the video encoder 111 encodes the input video data in the MVC mode, and generates the stream of the Base view video and the stream of the Dependent view video.

In Step S102, the PG encoder 112 encodes the data of input subtitles and generates the PG stream for the 3D subtitle mode and the PG stream for the aligned subtitle mode.

In Step S103, the PlayList generating unit 113 generates the PlayList file.

In Step S104, the multiplexing unit 114 multiplexes the stream of the Base view video, the stream of the Dependent view video generated by the video encoder 111, and the PG stream generated by the PG encoder 112 and generates TS.

In Step S105, the recording unit 115 records the TS generated by the multiplexing unit 114 and the PlayList file generated by the PlayList generating unit 113 on a recording medium such as BD or the like, and ends the process.

Modified Example

Hereinabove, the case where the video displayed in the effective image frame is the video of the Base view and the Dependent view has been described, but it may be possible to display 2D images in which there is no parallax between images of 2 frames arranged in a displaying order. Even when the content recorded on a recording medium such as BD or the like is 2D content including 2D image data, in the same manner as in the case of 3D content described above, it may be possible to display subtitles in the aligned subtitle area formed by clipping out and displacing the effective image frame in the playback device based on the description of the PlayList.

Position of Active_Video_Window( )

Hereinabove, the active_video_window( ) explained with reference to FIGS. 19 and 37 is described in PlayList, but may be described in other positions.

For example, it can be considered that Base view video stream and Dependent view video stream are multiplexed as the same TS or different TS, respectively, and then transmitted through broadcast waves and networks.

In this case, the active_video_window( ) is described in, for example, Program Specific Information (PSI) which is transmission controlling information, the Base view video stream, or the Dependent view video stream (elementary streams).

Figure 42:
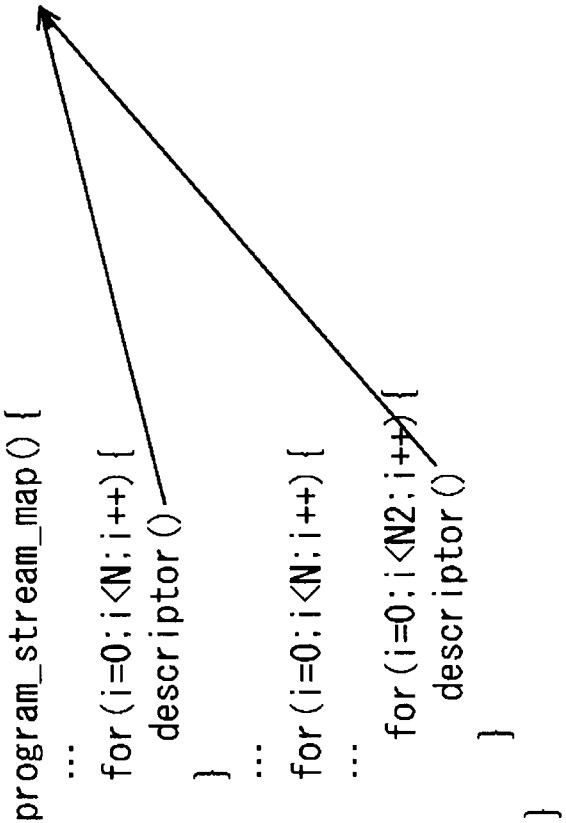
FIG. 42 is a diagram illustrating an example of a description position of the active_video_window( )

FIG. 42 is a diagram illustrating an example in which the active_video_window( ) is described in a Program Map Table (PMT) included in the PSI.

As shown in FIG. 42, a descriptor for describing the active_video_window( ) may be newly defined, and the active_video_window( ) may be described in the defined descriptor. In the example of FIG. 42, the active_video_window( ) of FIG. 37 is described. In addition, for example, 65 is given as a value of descriptor_tag.

Figure 43:
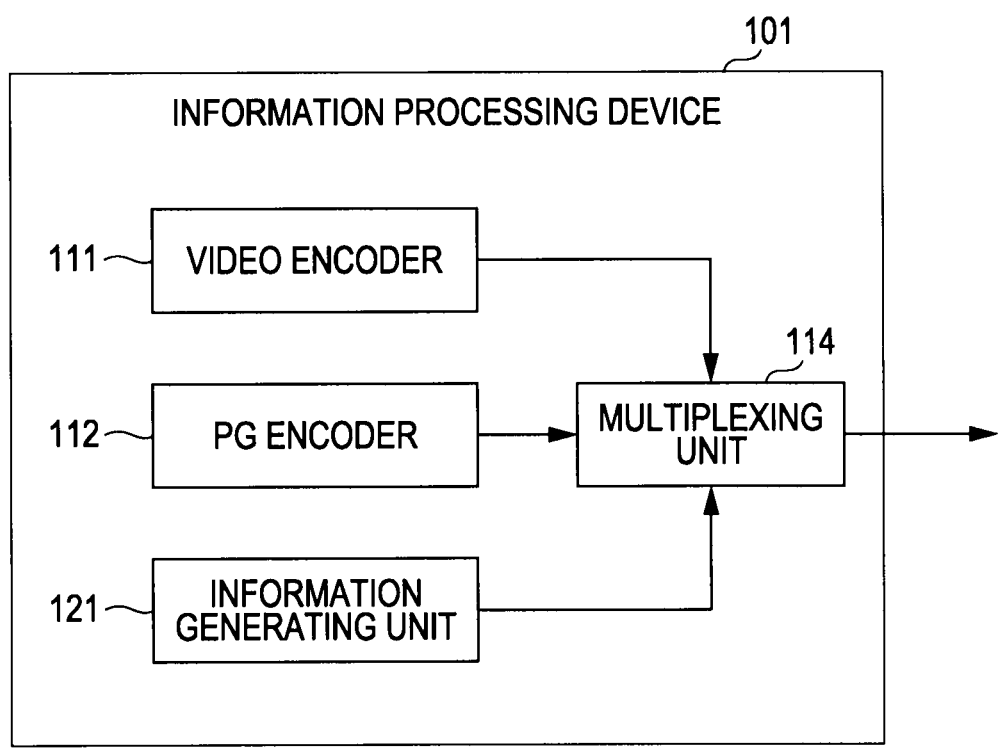
FIG. 43 is a diagram illustrating an example of a composition of another information processing device.

In this case, an information generating unit 121 of the information processing device 101 in FIG. 43 generates and outputs the PMT where the active_video_window( ) is described. In the composition shown in FIG. 43, the same composition as that of FIG. 40 is given with the same reference numerals. In the example of FIG. 43, the information generating unit 121 is provided instead of the PlayList generating unit 113 of FIG. 40.

The PMT output from the information generating unit 121 is multiplexed by the multiplexing unit 114 together with the Base view video stream and the Dependent view video stream. The TS obtained by the multiplexing is transmitted through broadcast waves and networks.

In the playback device that has received the TS, subtitles are displayed as described above based on the active_video_window( ) described in the PMT.

The active_video_window( ) may be described in other positions such as Selection Information Table (SIT) other than the PMT.

Figure 44:
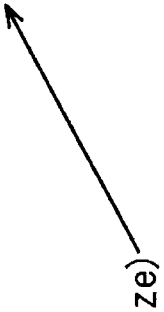
FIG. 44 is a diagram illustrating an example of another description position of the active_video_window( )

FIG. 44 is a diagram illustrating an example in which the active_video_window( ) is described in an elementary stream.

As shown in FIG. 44, the active_video_window( ) can be described in the SEI. The SEI is additional information added to data of each picture constituting the Base view video stream and the Dependent view video stream. The SEI which includes the active_video_window( ) is added to each picture of at least any one stream of the Base view video stream and the Dependent view video stream.

Figure 45:
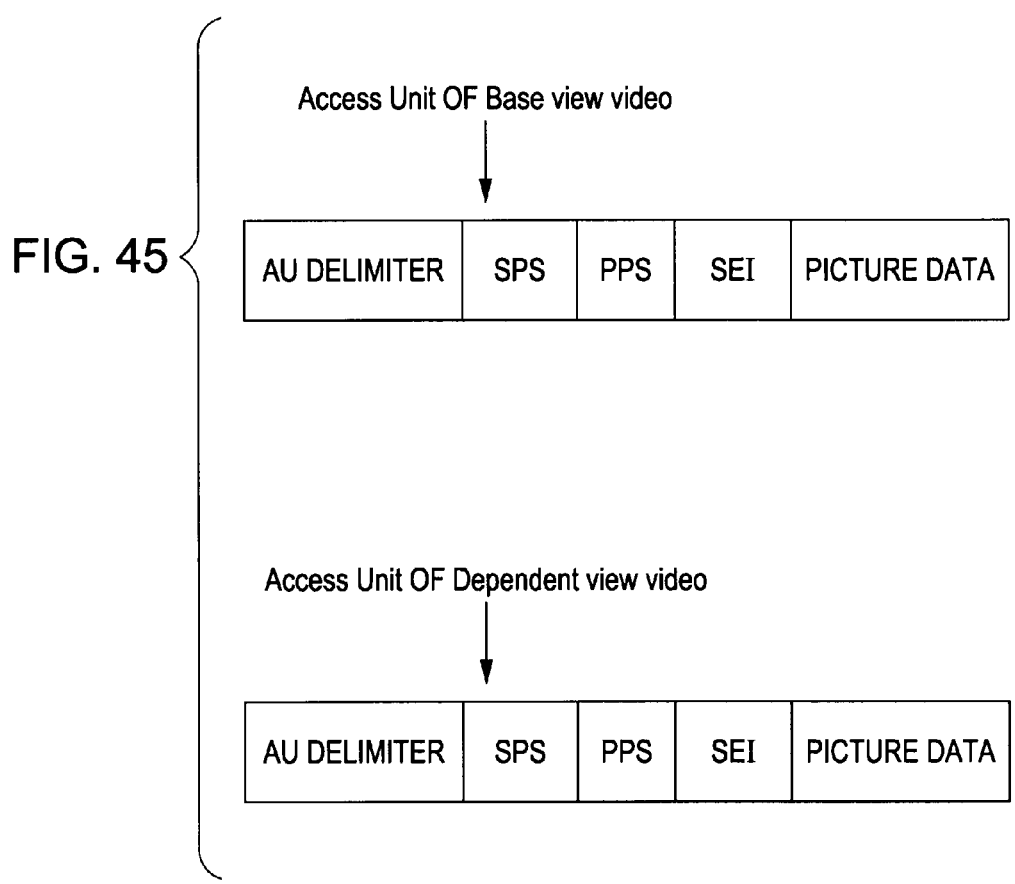
FIG. 45 is a diagram illustrating a composition of Access Unit.

FIG. 45 is a diagram illustrating a composition of Access Unit.

As shown in FIG. 45, Access Unit of the Base view video which includes data of one picture of the Base view video stream has the same composition as Access Unit of the Dependent view video which includes data of one picture of the Dependent view video stream. One Access Unit is constituted with AU delimiter indicating the head of the Access Unit, SPS, PPS, SEI, and picture data.

In this case, the information generating unit 121 of the information processing device 101 of FIG. 43 generates the SEI in which the active_video_window( ) is described, and outputs the SEI to the video encoder 111 through a path (not shown in the drawing). In the video encoder 111, the SEI is added to data of each picture of Base view video and Dependent view video obtained by encoding L image data and R image data in accordance with the standard of H.264 AVC/MVC.

The Base view video stream and the Dependent view video stream including the data of the picture added with the SEI, in which the active_video_window( ) is described, are multiplexed and then transmitted through broadcast waves or networks, or recorded on a recording medium.

In the playback device in which the SEI is read, subtitles are displayed as described above based on a value of the active_video_window( ) described in the SEI.

Example of Composition of Computer

A series of the process described above can be executed by hardware, and software. When a series of the process is executed by software, a program constituting the software is installed on a computer incorporating dedicated hardware and a general personal computer from a program recording medium.

FIG. 46 is a block diagram illustrating an example of a composition of hardware of a computer executing a series of the processes described above by a program.

A central processing unit (CPU) 151, a read only memory (ROM) 152, and a random access memory (RAM) 153 are connected to each other via a bus 154.

An input/output interface 155 is further connected to the bus 154. The input/output interface 155 is connected to an input unit 156 including a keyboard, a mouse or the like and an output unit 157 including a display, a speaker, or the like. In addition, the input/output interface 155 is connected to a storing unit 158 including a hard disk, a nonvolatile memory, or the like, a communicating unit 159 including a network interface or the like, and a drive 160 driving a removable media 161.

In the computer configured as above, a series of the processes described above is performed such that the CPU 151, for example, loads and executes the program stored in the storing unit 158 in the RAM 153 via the input/output interface 155 and the bus 154.

The program executed by the CPU 151 is recorded, for example, in the removable media 161, or provided through a wired or wireless transmitting medium such as a local area network, the Internet, or digital broadcasting, and installed in the storing unit 158.

Furthermore, the program executed by the computer may be a program that performs a process in a time series according to the order that the present specification describes, and/or may be a program in which a process is performed at a necessary time point when the program is called upon.

An embodiment of the present invention is not limited to the embodiments described above, and various modifications are possible as long as they do not depart from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    first encoding means for encoding an image for a left eye and an image for a right eye by H.264 AVC/MVC placing strip-shaped areas in the upper and lower sides over an entire horizontal direction for each frame;
    second encoding means for encoding at least one of: data of a first subtitle stream displayed in a third area formed by adding at least a part of one area of a second area which is the strip-shaped area in the lower side to at least a part of one area of a first area which is the strip-shaped area in the upper side, or data of a second subtitle stream displayed in a fourth area formed by adding at least a part of one area of the first area to at least a part of one area of the second area;
    generating means for generating a playlist file including play items indicating audio visual (AV) streams, including an extension data area configured to have private data inserted therein, and designated by an extension data start address,
    the extension data area including information which indicates an arrangement position of the effective image frame, and including a first offset value used in acquiring a position in an upper end of the effective image frame, a second offset value used in acquiring a position in a lower end of the effective image frame, a third offset value used in acquiring a position in the upper end of the effective image frame after moving in a case of displaying subtitles using the first subtitle stream, a fourth offset value used in acquiring a position in the upper end of the effective image frame after moving in a case of displaying subtitles using the second subtitle stream, and information indicating whether the effective image frame is to be moved in the upper direction or lower direction based on a position during encoding, and a fifth offset value used in acquiring the amount of movement of the effective image frame as control information to control the playback of content, the extension further including a table indicating for each subtitle stream whether a stream for a 3D subtitle mode is recorded or not and whether a stream for an aligned subtitle mode is recorded or not; and recording means for recording a base stream and a dependent stream which are obtained by encoding the image for the left eye and the image for the right eye, the subtitle stream, and the playlist file onto a recording medium.

2. The information processing device according to claim 1, wherein the generating means generates the control information which further includes flag information indicating whether the first subtitle stream is included in the content, and causes the control information to include information indicating an arrangement position of the effective image frame when the flag information indicates that the first subtitle stream is included in the content.

3. The information processing device according to claim 1, wherein the second encoding means encodes data of the second subtitle stream to be displayed within the effective image frame; and the recording means records encoded data of the second subtitle stream.

4. The information processing device according to claim 3, wherein the generating means further generates information indicating fixing of a relationship between a position of a display area of the second subtitle stream and a position of the effective image frame.

5. An information processing method comprising:

encoding an image for a left eye and an image for a right eye by H.264 AVC/MVC placing strip-shaped areas in the upper and lower sides over an entire horizontal direction for each frame;

encoding at least one of: a first subtitle stream to be displayed in a third area formed by adding at least a part of one area of a second area which is the strip-shaped area in the lower side to at least a part of one area of a first area, which is the strip-shaped area in the upper side, or data of a second subtitle stream displayed in a fourth area formed by adding at least a part of one area of the first area to at least a part of one area of the second area;

generating a playlist file including play items indicating audio visual (AV) streams, including an extension data area configured to have private data inserted therein, and designated by an extension data start address, the extension data area including information which indicates an arrangement position of the effective image frame and including a first offset value used in acquiring a position in an upper end of the effective image frame, a second offset value used in acquiring a position in a lower end of the effective image frame, a third offset value used in acquiring a position in the upper end of the effective image frame after moving in a case of displaying subtitles using the first subtitle stream, a fourth offset value used in acquiring a position in the upper end of the effective image frame after moving in a case of displaying subtitles using the second subtitle stream, and information indicating whether the effective image frame is to be moved in the upper direction or lower direction based on a position during encoding, and a fifth offset value used in acquiring the amount of movement of the effective image frame, as control information to control the playback of content, the extension further including a table indicating for each subtitle stream whether a stream for a 3D subtitle mode is recorded or not and whether a stream for an aligned subtitle mode is recorded or not; and recording a base stream and a dependent stream which are obtained by encoding the image for the left eye and the image for the right eye, the subtitle stream, and the playlist file onto a recording medium.

6. A non-transitory computer readable medium including computer executable instructions causing a computer to execute a process comprising:

encoding an image for a left eye and an image for a right eye by H.264 AVC/MVC placing strip-shaped areas in the upper and lower sides over an entire horizontal direction for each frame;

encoding at least one of: a first subtitle stream to be displayed in a third area formed by adding at least a part of one area of a second area which is the strip-shaped area in the lower side to at least a part of one area of a first area, which is the strip-shaped area in the upper side, or data of a second subtitle stream displayed in a fourth area formed by adding at least a part of one area of the first area to at least a part of one area of the second area;

generating a playlist file including play items indicating audio visual (AV) streams, including an extension data area configured to have private data inserted therein, and designated by an extension data start address, the extension data area including information which indicates an arrangement position of the effective image frame and including a first offset value used in acquiring a position in an upper end of the effective image frame, a second offset value used in acquiring a position in a lower end of the effective image frame, a third offset value used in acquiring a position in the upper end of the effective image frame after moving in a case of displaying subtitles using the first subtitle stream, a fourth offset value used in acquiring a position in the upper end of the effective image frame after moving in a case of displaying subtitles using the second subtitle stream, and information indicating whether the effective image frame is to be moved in the upper direction or lower direction based on a position during encoding, and a fifth offset value used in acquiring the amount of movement of the effective image frame, as control information to control the playback of content, the extension further including a table indicating for each subtitle stream whether a stream for a 3D subtitle mode is recorded or not and whether a stream for an aligned subtitle mode is recorded or not; and recording a base stream and a dependent stream which are obtained by encoding the image for the left eye and the image for the right eye, the subtitle stream, and the playlist file onto a recording medium.

7. A playback device comprising:

first decoding means for decoding a video stream obtained by encoding an image for a left eye and an image for a right eye by H.264 AVC/MVC placing strip-shaped areas in the upper and lower sides over an entire horizontal direction for each frame;

second decoding means for decoding data obtained by encoding at least one of: data of a first subtitle stream to be displayed in a third area formed by adding at least a part of one area of a second area which is the strip-shaped area in the lower side to at least a part of one area of a first area, which is the strip-shaped area in the upper side, or data of a second subtitle stream displayed in a fourth area formed by adding at least a part of one area of the first area to at least a part of one area of the second area;

image processing means for displaying the image within an effective image frame by moving a position of the effective image frame by referring to a playlist file including play items indicating audio visual (AV) streams, including an extension data area configured to have private data inserted therein, and designated by an extension data start address, the extension data area indicating an arrangement position of the effective image frame and including a first offset value used in acquiring a position in an upper end of the effective image frame, a second offset value used in acquiring a position in a lower end of the effective image frame, a third offset value used in acquiring a position in the upper end of the effective image frame after moving in a case of displaying subtitles using the first subtitle stream, a fourth offset value used in acquiring a position in the upper end of the effective image frame after moving in a case of displaying subtitles using the second subtitle stream, and information indicating whether the effective image frame is to be moved in the upper direction or lower direction based on a position during encoding, and a fifth offset value used in acquiring the amount of movement of the effective image frame, which is included in control information controlling the playback of content, the extension further including a table indicating for each subtitle stream whether a stream for a 3D subtitle mode is recorded or not and whether a stream for an aligned subtitle mode is recorded or not; and subtitle data processing means for displaying the first subtitle stream in the third area formed by moving the position of the effective image frame.

8. The playback device according to claim 7, wherein
the second decoding means decodes a stream of the second subtitle stream obtained by encoding data of the second subtitle stream to be displayed within the effective image frame; and
the subtitle data processing means sets a position indicated by position information in which a display area of the second subtitle stream is included in the second subtitle stream and displays the second subtitle stream.

9. The playback device according to claim 8, wherein
the image processing means moves a position of the third area when it is instructed that the third area, which is formed by moving the position of the effective image frame, is moved to another position; and
the subtitle data processing means sets the display area of the second subtitle stream on a position where a relationship between the display area of the second subtitle stream and the position of the effective image frame does not change, based on information indicating fixing of the relationship with respect to the position of the effective image frame, which is included in information indicating the arrangement position of the effective image frame, and displays the second subtitle stream.

10. The playback device according to claim 7, further comprising:
storing means for storing a value that indicates whether a mode in which the first subtitle stream is displayed in the third area is set or not,
wherein, in a case where a value that indicates the mode is set is set in the storing means, and when a value that indicates the first subtitle stream exists is included in playback control information for controlling the video stream and the stream of the first subtitle stream, the second decoding means performs decoding of the stream of the first subtitle stream, and the image processing means moves the position of the effective image frame to display the image in the effective image frame of which the position is moved.

11. A playback method comprising:
decoding a video stream obtained by encoding an image for a left eye and an image for a right eye by H.264 AVC/MVC placing strip-shaped areas in the upper and lower sides over an entire horizontal direction for each frame;
decoding data obtained by encoding at least one of: subtitle data of a first subtitle stream to be displayed in a third area formed by adding at least a part of one area of a second area which is the strip-shaped area in the lower side to at least a part of one area of a first area, which is the strip-shaped area in the upper side, or data of a second subtitle stream displayed in a fourth area formed by adding at least a part of one area of the first area to at least a part of one area of the second area;
displaying the image within an effective image frame by moving a position of the effective image frame by referring to a playlist file including play items indicating audio visual (AV) streams, including an extension data area configured to have private data inserted therein, and designated by an extension data start address,
the extension data area indicating an arrangement position of the effective image frame, which is included in control information controlling the playback of content, and including a first offset value used in acquiring a position in an upper end of the effective image frame, a second offset value used in acquiring a position in a lower end of the effective image frame, a third offset value used in acquiring a position in the upper end of the effective image frame after moving in a case of displaying subtitles using the first subtitle stream, a fourth offset value used in acquiring a position in the upper end of the effective image frame after moving in a case of displaying subtitles using the second subtitle stream, and information indicating whether the effective image frame is to be moved in the upper direction or lower direction based on a position during encoding, and a fifth offset value used in acquiring the amount of movement of the effective image frame,
the extension further including a table indicating for each subtitle stream whether a stream for a 3D subtitle mode is recorded or not and whether a stream for an aligned subtitle mode is recorded or not; and
displaying the subtitle stream in the third area formed by moving the position of the effective image frame.

12. A non-transitory computer readable program medium including computer executable instructions causing a computer to execute a process comprising:
decoding a video stream obtained by encoding an image for a left eye and an image for a right eye by H.264

AVC/MVC placing strip-shaped areas in the upper and lower sides over an entire horizontal direction for each frame;

decoding a data obtained by encoding at least one of: subtitle data of a first subtitle stream to be displayed in a third area formed by adding at least a part of one area of a second area which is the strip-shaped area in the lower side to at least a part of one area of a first area, which is the strip-shaped area in the upper side, or data of a second subtitle stream displayed in a fourth area formed by adding at least a part of one area of the first area to at least a part of one area of the second area;

displaying the image within an effective image frame by moving a position of the effective image frame by referring to a playlist file including play items indicating audio visual (AV) streams, including an extension data area configured to have private data inserted therein, and designated by an extension data start address, the extension data area indicating an arrangement position of the effective image frame, which is included in control information controlling the playback of content and including a first offset value used in acquiring a position in an upper end of the effective image frame, a second offset value used in acquiring a position in a lower end of the effective image frame, a third offset value used in acquiring a position in the upper end of the effective image frame after moving in a case of displaying subtitles using the first subtitle stream, a fourth offset value used in acquiring a position in the upper end of the effective image frame after moving in a case of displaying subtitles using the second subtitle stream, and information indicating whether the effective image frame is to be moved in the upper direction or lower direction based on a position during encoding, and a fifth offset value used in acquiring the amount of movement of the effective image frame, the extension further including a table indicating for each subtitle stream whether a stream for a 3D subtitle mode is recorded or not and whether a stream for an aligned subtitle mode is recorded or not; and displaying the subtitle streams in the third area formed by moving the position of the effective image frame.

13. An information processing device comprising:

a first encoding unit that encodes an image for a left eye and an image for a right eye by H.264 AVC/MVC placing strip-shaped areas in the upper and lower sides over an entire horizontal direction for each frame;

a second encoding unit that encodes at least one of: data of a first subtitle stream displayed in a third area formed by adding at least a part of one area of a second area which is the strip-shaped area in the lower side to at least a part of one area of a first area, which is the strip-shaped area in the upper side, or data of a second subtitle stream displayed in a fourth area formed by adding at least a part of one area of the first area to at least a part of one area of the second area;

a first generating unit that generates a playlist file including play items indicating audio visual (AV) streams, including an extension data area configured to have private data inserted therein, and designated by an extension data start address, the extension data area including information which is indicates an arrangement position of the effective image frame and including a first offset value used in acquiring a position in an upper end of the effective image frame, a second offset value used in acquiring a position in a lower end of the effective image frame, a third offset value used in acquiring a position in the upper end of the effective image frame after moving in a case of displaying subtitles using the first subtitle stream, a fourth offset value used in acquiring a position in the upper end of the effective image frame after moving in a case of displaying subtitles using the second subtitle stream, and information indicating whether the effective image frame is to be moved in the upper direction or lower direction based on a position during encoding, and a fifth offset value used in acquiring the amount of movement of the effective image frame, as control information to control the playback of content, the extension further including a table indicating for each subtitle stream whether a stream for a 3D subtitle mode is recorded or not and whether a stream for an aligned subtitle mode is recorded or not; and a recording unit that records a base stream and a dependent stream which are obtained by encoding the image for the left eye and the image for the right eye, the subtitle stream, and the playlist file onto a recording medium.

14. A playback device comprising:

a first decoding unit that decodes a video stream obtained by encoding an image for a left eye and an image for a right eye by H.264 AVC/MVC placing strip-shaped areas in the upper and lower sides over an entire horizontal direction for each frame;

a second decoding unit that decodes data obtained by encoding at least one of: data of a first subtitle stream to be displayed in a third area formed by adding at least a part of one area of a second area which is the strip-shaped area in the lower side to at least a part of one area of a first area, which is the strip-shaped area in the upper side, or data of a second subtitle stream displayed in a fourth area formed by adding at least a part of one area of the first area to at least a part of one area of the second area;

an image processing unit that displays the image within an effective image frame by moving a position of the effective image frame by referring to a playlist file including play items indicating audio visual (AV) streams, including an extension data area configured to have private data inserted therein, and designated by an extension data start address, the extension data area indicating an arrangement position of the effective image frame and including a first offset value used in acquiring a position in an upper end of the effective image frame, a second offset value used in acquiring a position in a lower end of the effective image frame, a third offset value used in acquiring a position in the upper end of the effective image frame after moving in a case of displaying subtitles using the first subtitle stream, a fourth offset value used in acquiring a position in the upper end of the effective image frame after moving in a case of displaying subtitles using the second subtitle stream, and information indicating whether the effective image frame is to be moved in the upper direction or lower direction based on a position during encoding, and a fifth offset value used in acquiring the amount of movement of the effective image frame, which is included in control information controlling the playback of content, the extension further including a table indicating for each subtitle stream whether a stream for a 3D subtitle mode is recorded or not and whether a stream for an aligned subtitle mode is recorded or not; and a subtitle data processing unit that displays the first subtitle stream in the third area formed by moving the position of the effective image frame.

\* \* \* \* \*